United States Patent
Tabata et al.

[19]

[11] Patent Number: 5,942,196
[45] Date of Patent: *Aug. 24, 1999

[54] OZONE GENERATING APPARATUS

[75] Inventors: Yoichiro Tabata; Masaki Kuzumoto, both of Tokyo, Japan

[73] Assignee: Mitsubishi Denki Kabushiki Kaisha, Tokyo, Japan

[*] Notice: This patent is subject to a terminal disclaimer.

[21] Appl. No.: 08/890,208

[22] Filed: Jul. 9, 1997

[30] Foreign Application Priority Data

Jul. 10, 1996 [JP] Japan .................................... 8-180799

[51] Int. Cl.$^6$ .................................................. B01J 19/08
[52] U.S. Cl. ................................ 422/186.07; 422/186.19; 422/186.2
[58] Field of Search ..................... 422/186.07, 186.19, 422/186.2

[56] References Cited

U.S. PATENT DOCUMENTS

| | | | |
|---|---|---|---|
| 3,973,133 | 8/1976 | Emigh et al. | 250/532 |
| 3,996,474 | 12/1976 | Lowther | 250/532 |
| 4,156,653 | 5/1979 | McKnight | 11/533 |
| 5,417,936 | 5/1995 | Suzuki et al. | 422/186.07 |
| 5,435,978 | 7/1995 | Yokomi | 422/186.07 |
| 5,759,497 | 6/1998 | Kuzumoto et al. | 4/1 |

FOREIGN PATENT DOCUMENTS

| | | |
|---|---|---|
| 35 25 708 | 1/1986 | Germany . |
| 61-014103 | 1/1986 | Japan . |
| 60251104 | 5/1986 | Japan . |
| 100780 | 2/1991 | Japan . |
| 9-118505 | 5/1997 | Japan . |

*Primary Examiner*—Kishor Mayekar
*Attorney, Agent, or Firm*—Sughrue, Mion, Zinn, Macpeak & Seas, PLLC

[57] ABSTRACT

An ozone generating apparatus including a discharge assembly having a common earth electrode (2) and high-voltage electrodes (3) disposed in opposition to each other with disk-like dielectric members (300) being interposed therebetween for generating electric discharge by applying a high voltage across the electrodes. A gas containing oxygen is supplied to discharge spaces (5) defined between the electrodes for generating ozone under the action of electric discharge. The discharge assembly includes a plurality of discharge cells (10a, 10b, 10c) constituted by disposing at least one of the dielectric member and the high-voltage electrode in a corresponding number relative to the earth electrode in common. A plurality of discharge assemblies are stacked and secured together to constitute a block A plurality of blocks are stacked and secured together to constitute a module. An ozone generating apparatus of a large capacity easy to effectuate assembling and maintenance is realized in a compact structure.

16 Claims, 25 Drawing Sheets

//...

OZONE GENERATING APPARATUS

BACKGROUND OF THE INVENTION

1. Field of the Invention

The present invention generally relates to an ozone generating apparatus. More particularly, the invention is directed to implementation of an ozone generating apparatus with a large capacity.

2. Description of Related Art

For having better understanding of the present invention, background techniques thereof will first be described in some detail. FIGS. 25A and 25B show in a sectional view and a front view, respectively, a major portion of a conventional ozone generating apparatus known as the "Otto-Plate" type ozone generating apparatus which is disclosed in "Ozonizer Handbook" edited by the Ozonizer Engineers Group of the Institute of Electronic Engineers of Japan and published by Corona Co. ltd., 1950, p. 249. Referring to the figures, the conventional ozone generating apparatus is comprised of a power source 1, metal electrodes 2 coupled to the ground potential, high-voltage electrodes 3 disposed in opposition to the metal electrodes 2, respectively, and connected to the power source I to be applied with a high voltage, dielectric plates (glass plate) 4 disposed on the surfaces of the metal electrode 2 and the high-voltage electrode 3, respectively, discharge spaces 5 in each of which an electric discharge takes place, spacers 6 formed of an electrically insulating material (dielectric material) and defining the discharge spaces 5, respectively, raw gas supply ports 7, a gas exit port 8 and an ozonized gas discharge pipe 9. The metal electrode 2, the high-voltage electrode 3 and the dielectric plates 4 disposed between the electrodes 2 and 3 cooperate to constitute one discharge cell.

Next operation of the ozone generating apparatus implemented in the above structure will be described below. In the case of the conventional ozone generating apparatus described above, gas discharge holes are formed in the metal electrodes 2, the high-voltage electrodes 3 and the dielectric plate 4 at center portions, respectively. Although no description is found concerning the spacer 6 in the above-mentioned publication, the spacers 6 of a dielectric material are disposed around the discharge space 5 in an array not interfering the gas flow for the purpose of sustaining distance (gap length) between the dielectric plates 4.

A raw gas containing oxygen is introduced into the ozone generating apparatus from the ambient, as indicated by arrows 7. A part of oxygen contained in the raw gas is ozonized when the raw gas passes through the discharge spaces 5 within each of which the electric discharge is taking place under the action of a high voltage applied from the power source 1. The gas containing ozone as generated is taken out as an ozonized gas in the direction indicated by an arrow 8 by way of the ozonized gas discharge pipe 9 disposed at a center portion of the ozone generating apparatus.

As will readily be understood, the electric discharge within the discharge space 5 is accompanied with generation of heat. Consequently, unless the gas flowing through the discharge spaces is cooled effectively, the temperature of the gas within the discharge space 5 increases, involving reduction in the amount of ozone generated. For this reason, the metal electrode 2 and the high-voltage electrode 3 are cooled by using an electrically insulating liquid such as an insulating oil to thereby suppress the gas temperature from increasing.

In order to realize the conventional ozone generating apparatus of the structure described above with a large capacity, a plurality of discharge cells are stacked in plural stages, as is schematically illustrated in FIG. 25A. Obviously, the amount of ozone as generated increases in proportion to the number of the stages of the discharge cells. In the practical applications in the individual field such as water treatment, pulp bleaching and the like, there are usually demanded several ten ozone generating apparatuses each including several ten or more discharge cells. Consequently, in the implementation of an ozone production system of a large capacity, the number of the electrodes as well as the number of the parts required for the assembling increases in proportion to the number of the stages of the ozone generating cells and/or the number of the ozone generating apparatus as employed, which will of course incur not only a high manufacturing cost but also a large space for installation and difficulty in effecting the maintenance or other services.

In this conjunction, it is also noted that the amount of ozone generated can be increased by increasing the electric discharge area of each discharge cell. However, when the diameter of the electrode is increased excessively, there will arise a problem that the thickness of the electrode has to be increased remarkably in order to secure a desired flatness of the electrode with a high precision, as a result of which the weight of each electrode will necessarily increase considerably. Besides, it is noted that the dielectric member 4 is usually feeble in mechanical strength, making it difficult to realize a desired flatness. Thus, limitation is imposed to the attempt for increasing the electric discharge area of the electrodes.

SUMMARY OF THE INVENTION

In the light of the state of the art described above, it is a first object of the present invention to provide an ozone generating apparatus of a large capacity which is capable of producing a large amount of ozone with a simplified structure easy to manufacture in a compact size with a small number of parts without need for enlarging dimensions of electrodes and dielectric member, to thereby solve successfully such problems that the electrode has to be formed in an increased thickness in order to realize the flatness thereof with a desired precision for ensuring a large electrode surface and that the dielectric member which is inherently poor in the mechanical strength is difficult to realize a desired flatness.

It is a second object of the present invention is to provide an ozone generating apparatus of a large capacity for which works or services such as stacking of the discharge cells, inspection thereof, exchange and the like can easily be carried out.

In view of the above and other objects which will become apparent as the description proceeds, the present invention is directed to an ozone generating apparatus which includes a discharge assembly comprised of an earth electrode and a high-voltage electrode disposed in opposition to each other with a dielectric member being interposed between the earth electrode and the high-voltage electrode for generating electric discharge by applying a high voltage across the earth electrode and the high-voltage electrode, wherein a gas containing oxygen is supplied to a discharge space defined between the electrodes for generating ozone under the action of the electric discharge.

According to a first aspect of the invention, the discharge assembly comprises a plurality of discharge cells realized by disposing at least one dielectric member and at least one high-voltage electrode in opposition to the earth electrode in common.

With the arrangement of the ozone generating apparatus, there can be obtained an ozone generating apparatus of a large capacity which is capable of producing a large amount of ozone with a simplified structure easy to manufacture in a compact size with a smaller number of parts without need for enlarging the size of the electrodes and the dielectric members. Thus, the problems which the conventional apparatus suffers can be solved satisfactorily. More specifically, the electrodes need not be formed in an increased thickness in order to realize the desired flatness with high precision for ensuring a large electrode surface. Additionally, flatness of the dielectric member which is inherently poor in the mechanical strength need not be realized with high precision.

In a preferred mode for carrying out the invention, the at least one high-voltage electrode comprises a single high-voltage electrode having a plurality of discharge points corresponding in number to the discharge cells.

In another preferred mode for carrying out the invention, the at least one high-voltage electrode comprises a plurality of high-voltage electrodes corresponding in number to said discharge cells.

In a further preferred mode for carrying out the invention, the earth electrode or the high-voltage electrode may have an electrically conductive film deposited on one surface of a disk-like dielectric member, wherein the electrically conductive film can be electrically connected to a plate-like metal member for feeding electric energy.

With this structure, the electrode and the dielectric member are contacted intimately, whereby the discharge efficiency can be enhance.

In a further preferred mode for carrying out the invention, the earth electrode or the high-voltage electrode may have a discharge surface deposited with a dielectric film.

With this structure, the electrode and the dielectric member are contacted intimately, whereby the discharge efficiency can be enhance.

In a further preferred mode for carrying out the invention, the earth electrode may be formed of light metal or light alloy.

Owing to the structure described above, ozone generating apparatus can be implemented in light weight. Besides, the stacking of the discharge units or assemblies as well as transportation of the ozone generating apparatus particularly of a large size can be facilitated.

In a further preferred mode for carrying out the invention, the earth electrode may be formed in a polygonal shape.

By virtue of the structure of the ozone generating apparatus described above, an empty space is made available between a cylindrical pressure vessel and the polygonal earth electrodes. Thus, the overcurrent protecting fuses and a coolant feeding/discharging mechanism for cooling the earth electrodes can be disposed within the space mentioned above. Consequently, the ozone generating apparatus can be realized in a compact size.

In a further preferred mode for carrying out the invention, at least a portion of the electrodes is so processed as to be capable of withstanding action of ozone.

With this arrangement, the electrodes can be protected against oxidization or deterioration brought about by ozone.

In a yet further preferred mode for carrying out the invention, the earth electrode may have a hollow portion through which a cooling medium flows, wherein a surface of the earth electrode which is brought into contact with the cooling medium is treated by an anticorrosion process.

Thus, the apparatus can be protected against corrosion brought about by the cooling medium.

In a still further preferred mode for carrying out the invention, the dielectric member and the high-voltage electrode may be held by the earth electrode.

With the arrangement of the ozone generating apparatus described above, the stacking and the maintenance of the discharge unit can be facilitated.

In a preferred mode for carrying out the invention, the earth electrode may be so arranged as to hold an overcurrent protecting fuse or fuses at a side surface thereof, wherein the fuse is inserted between the high-voltage power source and the high-voltage electrode.

Owing to the above arrangement, maintenance of the apparatus can be facilitated.

In a further preferred mode for carrying out the invention, a plurality of the discharge assemblies may be stacked in a multi-stage structure by means of a coupling rod for holding the discharge assemblies with a predetermined distance from the dielectric member.

With the arrangement mentioned above, unwanted discharge is difficult to occur at locations where the dielectric member and the ceramic coating are positioned close to each other or at edge portions of the dielectric member and the electrically conductive film in the case where the electrically conductive film is formed on the dielectric member. Thus, the problems such as insulation failure of the dielectric member or breakage thereof due to the unwanted discharge during the operation of the ozone generating apparatus can be successfully evaded, whereby stable operation can be ensured.

In a yet further preferred mode for carrying out the invention, a plurality of the discharge assemblies may be stacked in a vertical direction.

With the above arrangement, the discharge units or assemblies can be stacked easily, while there arises no necessity of supporting a plurality of stacked discharge units against the weight load thereof by means of the coupling rods, as in the case where the ozone discharging units or assemblies are stacked horizontally. Besides, because the space required for the installation of the ozone generating apparatus is relatively small, the discharge units or assemblies can easily be stacked even at a narrow place by using a crane or the like. Thus, the ozone generating apparatus can be implemented with a large capacity.

In a further preferred mode for carrying out the invention, at least three discharge cells may be constituted by using at least three high-voltage electrodes applied with three-phase AC powers of different phases from a three-phase power source.

With the arrangement described above, the three discharge cells can be driven from a single power source. Thus, the latter can be implemented compactly and inexpensively.

In a further preferred mode for carrying out the invention, at least a high-voltage generating circuit unit of an ozone generating power source for applying a high voltage across the electrodes may be disposed in the vicinity of a main body of the ozone generating apparatus, while at least an inverter control circuit unit may be disposed at a location remote from the main body of the ozone generating apparatus.

With the arrangement of the ozone generating apparatus described above, the wiring distance from the high-voltage generating circuit to the ozone generator main body can be shortened, which is advantageous for suppressing failures such as leakages which may take place among the wires in the form of concern discharge, creeping discharge or the like. Further, voltages at the output lines extending from the three-phase inverter circuit can be lowered. Thus, the wiring for the output lines is facilitated because the wiring distance can be increased. Besides, since the inverter control circuit can be implemented in light weight, it may be installed in a room different from that for installation of the main body of the ozone generating apparatus.

According to a second aspect of the present invention, there is provided an ozone generating apparatus which includes a plurality of discharge assemblies each including an earth electrode and a high-voltage electrode disposed in opposition to each other with a dielectric member being interposed therebetween for generating electric discharge under a high voltage applied across the electrodes. The plurality of discharge assemblies are stacked and secured together to thereby constitute a block. Further, a plurality of the blocks are stacked and secured together to thereby constitute a module. A gas containing oxygen is supplied to discharge spaces defined between the electrodes to thereby produce ozone under the action of the electric discharge.

With the structure of the ozone generating apparatus mentioned above, stacking of the discharge units and the blocks as well as maintenance of the ozone generating apparatus can easily be carried out to an additional advantage.

Equally, in a preferred mode for realizing the aforementioned ozone generating apparatus, the discharge assembly may be constituted by a plurality of discharge cells realized by disposing at least one of the dielectric member and the high-voltage electrode in a corresponding number in opposition to the earth electrode in common.

By virtue of the structure of the ozone generating apparatus described above, there can be realized the apparatus of a large capacity which is easy to manufacture and capable of producing a large amount of ozone, to an advantage additionally to those mentioned hereinbefore.

Furthermore, in a preferred mode for realizing the ozone generating apparatus described above, the plurality of stacked blocks can be secured together by inserting coupling rods through a plurality of hooks provided at lateral surfaces of the earth electrodes or alternatively through-holes formed so as to extend through the earth electrodes.

With this structure of the ozone generating apparatus, the discharge units or discharge assemblies can easily be secured together.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
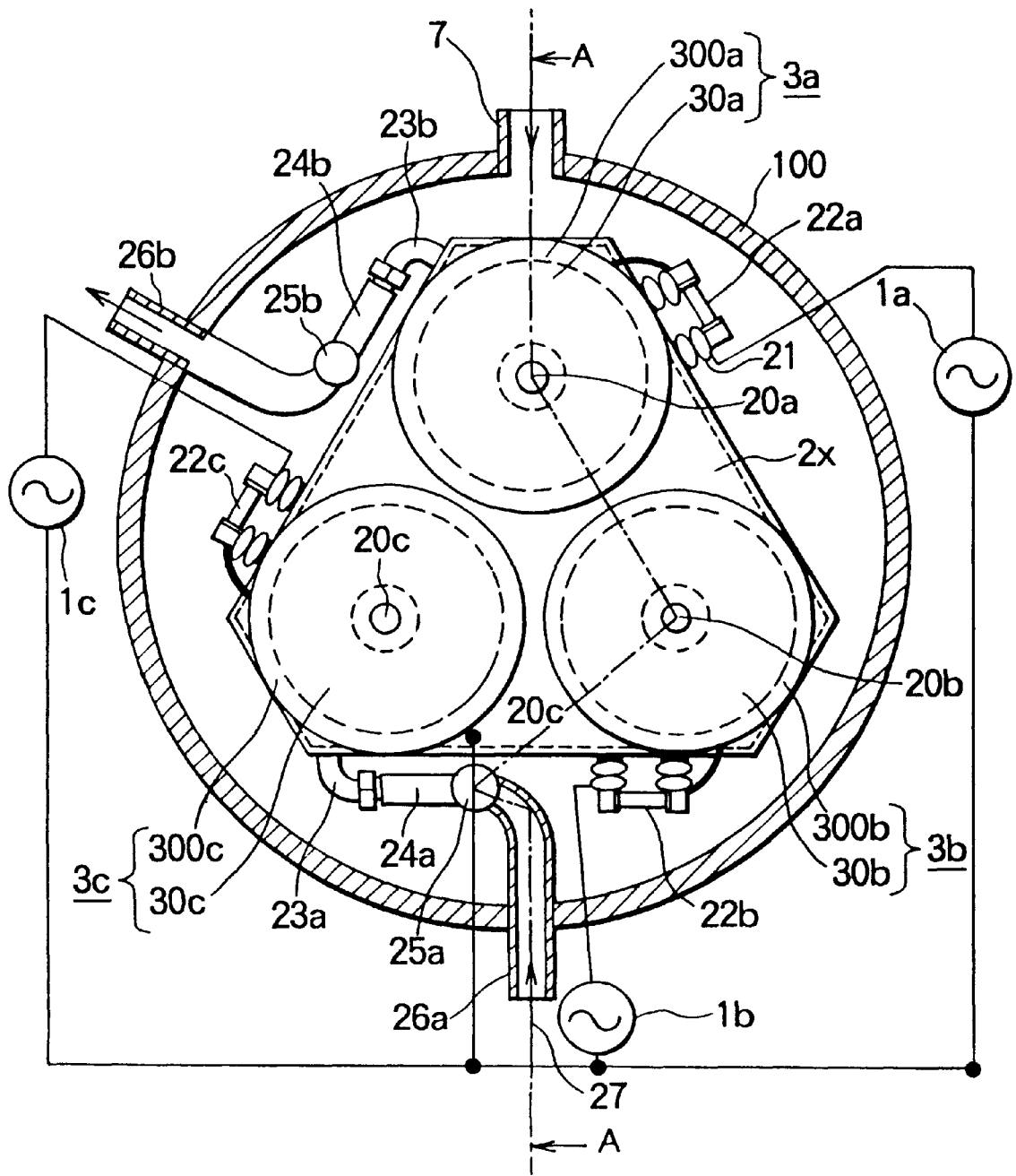
FIG. 1 is a plan view showing an ozone generating apparatus according to a first embodiment of the present invention with some portions being shown in section as viewed in the direction along an arrowed line B—B in FIG. 2.

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "vertical", "horizontal" and the like are words of convenience and are not to be construed as limiting terms.

Embodiment 1

Figure 2:
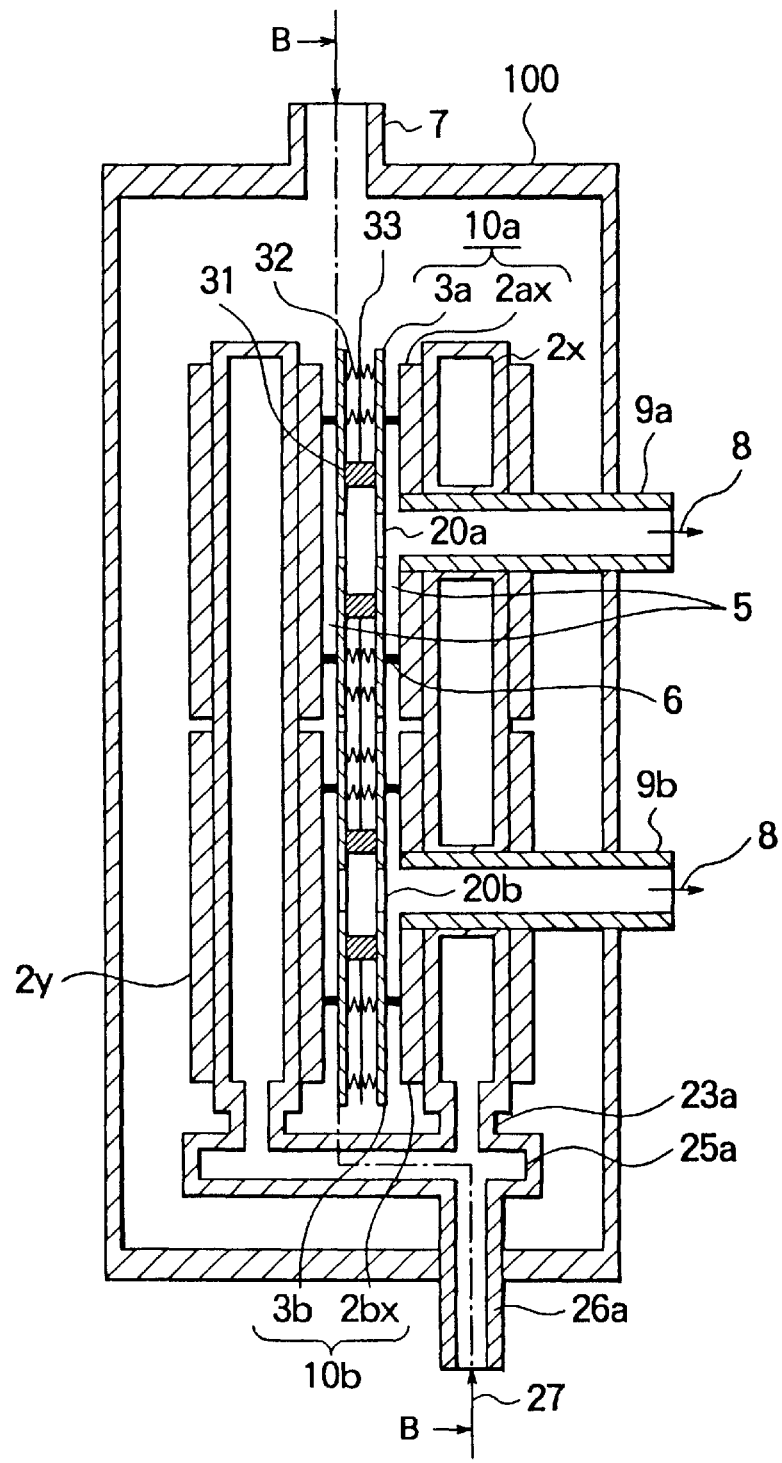
FIG. 2 is a view showing the same in section as viewed in the direction along an arrowed line A—A in FIG. 1.

Now, description will be made of an ozone generating apparatus according to a first embodiment of the invention by reference to FIGS. 1 and 2, in which FIG. 1 is a plan view showing the ozone generating apparatus with some portions in section as viewed in the direction indicated by a line B—B in FIG. 2 which in turn shows the same in a sectional view as viewed in the direction along a line A—A in FIG. 1. Referring to the figures, the ozone generating apparatus according to the instant embodiment includes ozone generating power sources 1a, 1b and 1c, earth electrodes 2x and 2y each of modified hexagonal form, disk-like dielectric members 300a, 300b and 300c having respective one surfaces deposited with electrically conductive films 30a, 30b and 30c to constitute dielectric high-voltage electrodes 3a, 3b and 3c, respectively, metal springs 32, each being formed of an electrically conductive elastic material, and electric feeder plates 33 for supplying a high voltage, wherein the electric feeder plates 33 are electrically connected to the electrically conductive films 30a, 30b and 30c of the dielectric high-voltage electrodes 3a, 3b and 3c, respectively, by way of the metal springs 32 for applying a high voltage to each of the conductive films 30a, 30b and 30c.

In the ozone generating apparatus according to the instant embodiment of the invention, each of the earth electrodes 2x and 2y of the modified hexagonal shape is partitioned into three equal portions with an angle of 120 degrees around the center to thereby define the earth electrode surfaces to which electrically conductive members 2ax, 2bx and 2cx each of a disk-like shape and having a flatness of high precision and serving as a discharge surface are joined, wherein the three dielectric high-voltage electrodes 3a, 3b and 3c are disposed in opposition to the electrically conductive members 2ax, 2bx and 2cx, respectively. Parenthetically, electrically conductive member 2cx is not shown. The discharge portion having the common earth electrode 2x and the dielectric high-voltage electrodes 3a, 3b and 3c are referred to as the ozone generating discharge cells 10a, 10b and 10n, respectively. Incidentally, the ozone generating discharge cell 10c is omitted from illustration. Thus, in the ozone generating apparatus according to the instant embodiment of the invention, the common earth electrode 2x and the three ozone generating discharge cells 10a, 10b and 10c cooperate to constitute a discharge assembly or discharge unit. The ozone generating apparatus further includes gas guide passages 20a, 20b and 20c, porcelain insulators 21 and overcurrent protecting fuses 22a, 22b and 22c which are held at lateral sides of the common earth electrode 2x, respectively.

Furthermore, the ozone generating apparatus according to the instant embodiment of the invention includes a cooling water inlet port 23a and a cooling water outlet port 23b for water serving as a coolant for cooling the earth electrodes 2x and 2y, pipes 24a and 24b, coolant header/relay tubes 25a and 25b provided for cooling a plurality of earth electrodes, and an inlet port 26a and the outlet port 26b for main coolant pipes, respectively, which are so arranged that the cooling medium or water can flow through hollow portions formed in the earth electrodes. The flow of cooling water is indicated by arrows 27. Additionally, the ozone generating apparatus includes discharge spaces 5 in which electric discharge is generated, spacers 6 for defining the discharge space, gas sealing members 31 made of an elastic material, a raw gas supply port 7, ozonized-gas discharge pipes 9a, 9b and 9c and an ozone generator 10, wherein the direction in which the ozonized gas is discharged is indicated by arrows 8.

Next, description will be directed to operation of the ozone generating apparatus. Referring to FIGS. 1 and 2, high voltages generated by the ozone generating power sources 1a, 1b and 1c are applied to the dielectric high-voltage electrodes 3a, 3b and 3c by way of the overcurrent protecting fuses 22a, 22b and 22c mounted on the lateral sides of the earth electrodes 2x and 2y, the electric feeder plates 33 and the metal springs 32. When the raw gas containing oxygen is introduced or charged in the ozone generating apparatus from the raw gas supply port 7 formed in a pressure vessel 100, the raw gas is forced to flow into the discharge spaces 5 from the peripheries of the ozone generating discharge cells 10a, 10b and 10c, respectively, to be ozonized under the action of the silent discharge taking place in the discharge spaces 5. The ozonized gas leaving the discharge spaces 5 are directed into the gas guide passages 20a, 20b and 20c to be discharged outwardly through the ozonized-gas discharge pipes 9a, 9b and 9c in the directions indicated by the arrows 8.

As will now be understood from the above description, the ozone generating apparatus according to the instant embodiment can be implemented with a large capacity with the discharge area being increased by disposing a plurality of electrically conductive films 30a, 30b and 30c and disk-like dielectric members 300a, 300b and 300c in opposition to the common earth electrode 2x without need for increasing the size of the disk-like dielectric members 300a, 300b and 300c which are inherently poor in the mechanical strength, making it difficult to realize desired flatness and/or increasing the size of the high-voltage electrode or electrically conductive films 30a, 30b and 30c which have to be thickened in order to realize the flatness with desired precision. Besides, the number of the earth electrodes as well as fitting parts associated therewith such as cooling joints for the earth electrodes can be decreased while ensuring generation of ozone in a large amount. Further, by disposing a plurality of discharge cells effectively relative to the common earth electrode, the ozone generating apparatus can be manufactured in a compact structure.

At this juncture, it should be mentioned that because the disk-like electrically conductive members 2ax, 2bx and 2ex each having flatness with high precision are joined to the common earth electrode 2x, the discharge surface of the common earth electrode 2x can be realized with the flatness of desired precision.

In the case of the ozone generating apparatus according to the instant embodiment of the invention, the earth electrodes 2x and 2y are each formed in a modified hexagonal shape. Consequently, empty spaces are formed between the cylindrical pressure vessel 100 and the earth electrodes 2x and 2y.

Accordingly, by mounting the overcurrent protecting fuses 22a, 22b and 22c on the lateral sides of the earth electrodes facing the empty space by means of the porcelain insulators 21 or by disposing the earth electrode cooling medium feed/discharge mechanisms within the empty space, the ozone generating apparatus can be implemented in a compact structure of a small size. Besides, by assembling the overcurrent protecting fuses 22a, 22b and 22c integrally with the common earth electrodes 2x and 2y, the ozone generating discharge cell can be regarded as a single part, which facilitates stacking of the ozone generating discharge cells.

The voltage applied to the discharge space is a high voltage of high frequency on the order of several kV having a frequency of 1 kHz to several ten kHz. Consequently, in the ozone generating apparatus including a plurality of ozone generating discharge units stacked in plural stages, the high-frequency high voltage wires for applying the high voltage to the individual ozone generating discharge cells can be made very short because the overcurrent protecting fuses 22a, 22b and 22c are disposed in the vicinity of the ozone generating discharge cells 10a, 10b and 10c, respectively. Besides, there is substantially no possibility of the high-frequency high voltage wire for one ozone generating discharge cell being brought into contact with the high-frequency high voltage wire for the adjacent discharge cell, which in turn means that possibility of insulation failure between the high-voltage wires can be suppressed.

Additionally, in the ozone generating apparatus in which the overcurrent protecting fuses 22a, 22b and 22c are integrally mounted on the earth electrodes, as shown in FIG. 1, if the overcurrent protecting fuse 22a or 22b or 22c is blown off by an overcurrent due to failure of the discharge cell 10a or 10b or 10c, then the discharge unit having the discharge cell suffering the failure can be exchanged with the sound one. In that case, the overcurrent protecting fuses 22a, 22b and 22c can be exchanged concurrently. Thus, the maintenance for the electrodes as well as repairing service can be facilitated.

In the case of the ozone generating apparatus according to the instant embodiment of the invention, three dielectric high-voltage electrodes 3a, 3b and 3c are juxtaposed in opposition to the common earth electrode 2x to thereby constitute the three discharge cells with the overcurrent protecting fuses being integrally mounted on the side walls of the earth electrode. However, the overcurrent protecting fuse can equally be mounted integrally on the earth electrode even in such arrangement that one high-voltage electrode is disposed in opposition to one earth electrode. In that case, the stacking and the maintenance can equally be facilitated, as mentioned previously.

In the ozone generating apparatus according to the instant embodiment of the invention, each of the earth electrodes 2x and 2y has one earth electrode surface on which the three ozone generating discharge cells 10a, 10b and 10c are defined. Consequently, each of the earth electrodes 2x and 2y has a large size and will become very heavy when the earth electrode is made of stainless steel, making it difficult to stack the ozone generating discharge units. Besides, transportation of the ozone generating apparatus will encounter difficulty because of heaviness of the ozone generating apparatus on the whole. Accordingly, the earth electrodes 2x and 2y should preferably be made of a light metal or light alloy such as aluminum, titanium or the like in order to reduce the weight and facilitate the stacking of the discharge units as well as transportation of the ozone generating apparatus particularly of a large size.

The cooling water used as the cooling medium is introduced into the coolant header/relay tube 25a to be supplied to the hollow portions of the common earth electrodes 2x and 2y by way of the pipe 24a and the cooling water inlet port 23a and serves for preventing the temperature of the gas within the discharge spaces 5 from increasing, to thereby sustain optimally the ozone generating performance. Cooling water leaving the common earth electrodes 2x and 2y is directed to the coolant header/relay tube 25b by way of the pipe 24b. When cooling water is caused to flow on or along the earth electrodes 2x and 2y in this way, a surface portion of the earth electrode brought into contact with the cooling medium or water may be electrically corrected. Accordingly, it is preferred to coat the concerned electrode surface with glass or ceramic to thereby protect the earth electrode from the corrosion.

Parenthetically, the anticorrosion treatment such as the glass coating will be accompanied with troublesome work and relatively high work cost in the case of the ozone generating apparatus of a small capacity incorporating the earth electrode having a small surface. However, in the case of the ozone generating apparatus of a large size, the work cost involved in the anticorrosion treatment of the surfaces of the common earth electrodes 2x and 2y which are brought into contact with cooling water is relatively low, to another advantage.

It is further noted that the surfaces of the earth electrodes 2x and 2y facing in opposition to the dielectric high-voltage electrodes 3a, 3b and 3c undergo oxidation with ozone generated by the electric discharge, whereby rust is formed on these surfaces. Besides, the electric discharge promotes the growth of such rust. Consequently, insulation failure may possibly take place due to fall-off and deposition of the rust on the surface of the disk-like dielectric member 300a, 300b, 300c or other inner portions of the ozone generating apparatus. For this reason, it is preferred to coat the surfaces of the earth electrodes 2x and 2y facing the dielectric high-voltage electrodes 3a, 3b and 3c with glass or ceramic for thereby protecting these surfaces against oxidization by ozone.

Similarly, the surfaces of the electrically conductive films 30a, 30b and 30c of the dielectric high-voltage electrodes 3a, 3b and 3c which face oppositely to the electric feeder plates 33 may undergo deterioration due to the action of ozone. Accordingly, these surfaces should equally be coated with glass or ceramic for thereby protecting them against deterioration due to ozone.

In this conjunction, it is noted that the work cost involved in carrying out the anti-ozone treatment is relatively low in the case of the ozone generating apparatus of a large size when compared with the apparatus of a small size.

Embodiment 2

Figure 3:
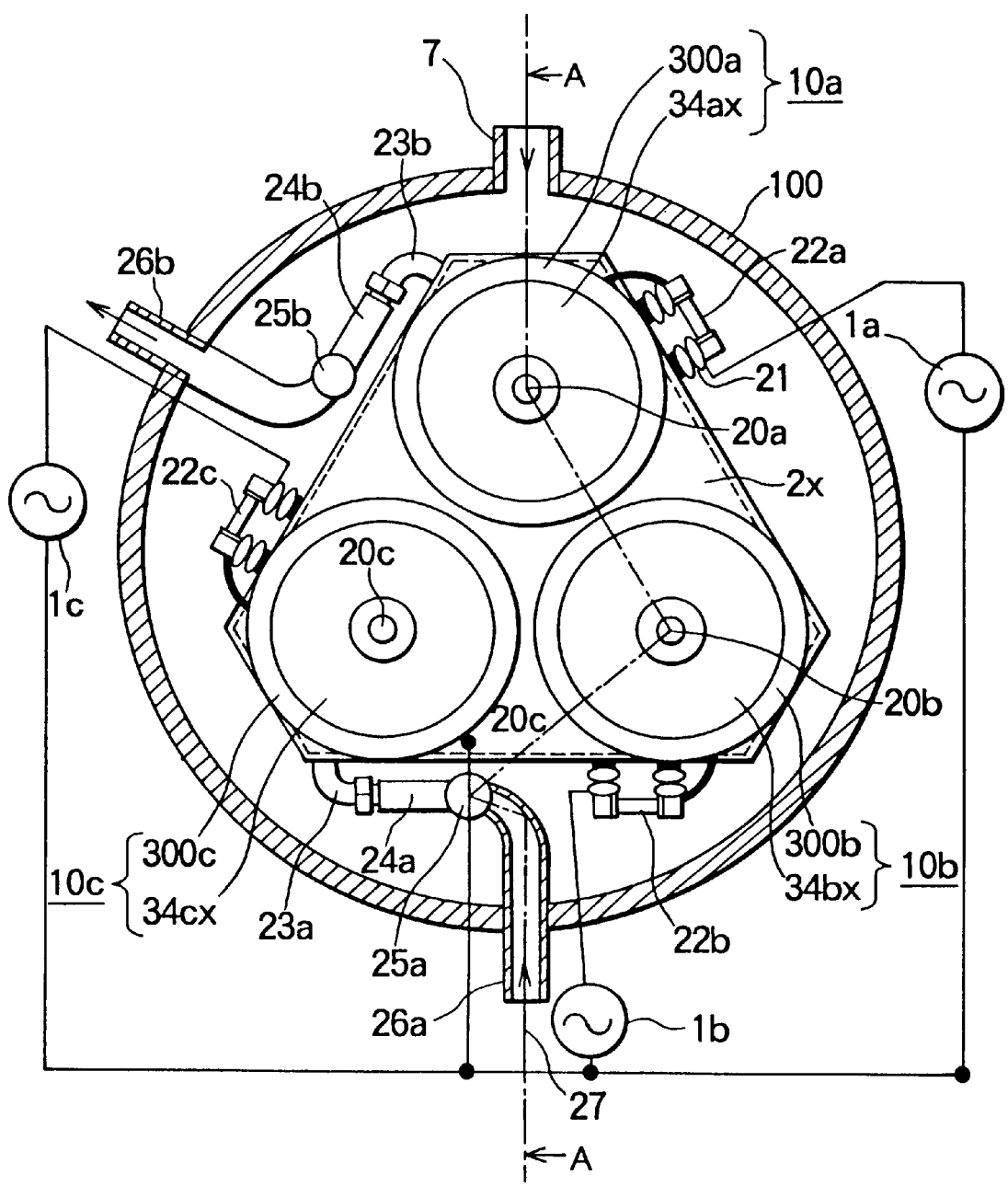
FIG. 3 is a plan view showing an ozone generating apparatus according to an second embodiment of the present invention with some portions in section as viewed along a line B—B in FIG. 4.
Figure 4:
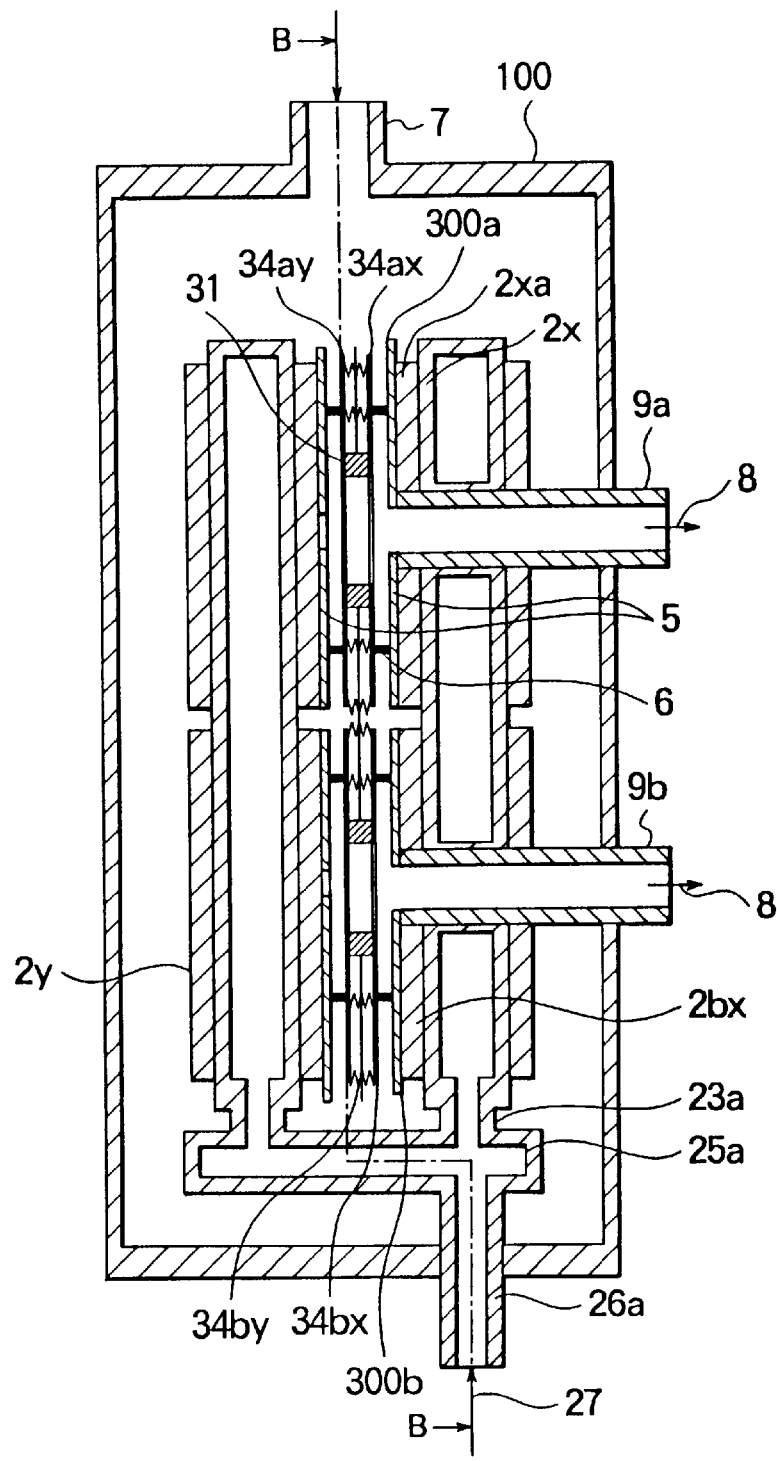
FIG. 4 is a view showing the same in section as viewed in the direction along an arrowed line A—A in FIG. 3.

FIGS. 3 and 4 shows major portions of an ozone generating apparatus according to a second embodiment of the invention, wherein FIG. 3 is a plan view showing the ozone generating apparatus with some portions in section as viewed in the direction indicated by an arrowed line B—B in FIG. 4 which in turn shows the same in a sectional view as viewed in the direction along a line A—A in FIG. 3. Referring to the figures, the ozone generating apparatus according to the instant embodiment includes disk-like high-voltage electrodes 34ax, 34ay, 34bx, 34by, 34cx and 34cy each formed of a metal.

In the ozone generating apparatus now under consideration, the disk-like dielectric members 300a, 300b and 300c are disposed in opposition to the disk-like high-voltage electrodes 34ax 34bx and 34cx with interposition of the spacers 6, respectively, wherein the electrically conductive films 30a, 30b and 30c are formed, respectively, on these surfaces of the disk-like dielectric members 300a, 300b and 300c which face the earth electrode. The surfaces of the electrically conductive films 30a, 30b and 30c are electrically contacted to the common earth electrode 2x to thereby constitute the dielectric earth electrode.

Thus, in the ozone generating apparatus according to the instant embodiment of the invention, the three disk-like high-voltage electrodes 34ax, 34bx and 34cx and the three disk-like dielectric members 300a, 300b and 300c are disposed in opposition to the common earth electrode 2x, whereby three discharge cells are realized. This structure is equally advantageous in realizing the ozone generating apparatus with a large capacity, similarly to the ozone generating apparatus according to the first embodiment.

Embodiment 3

Figure 5:
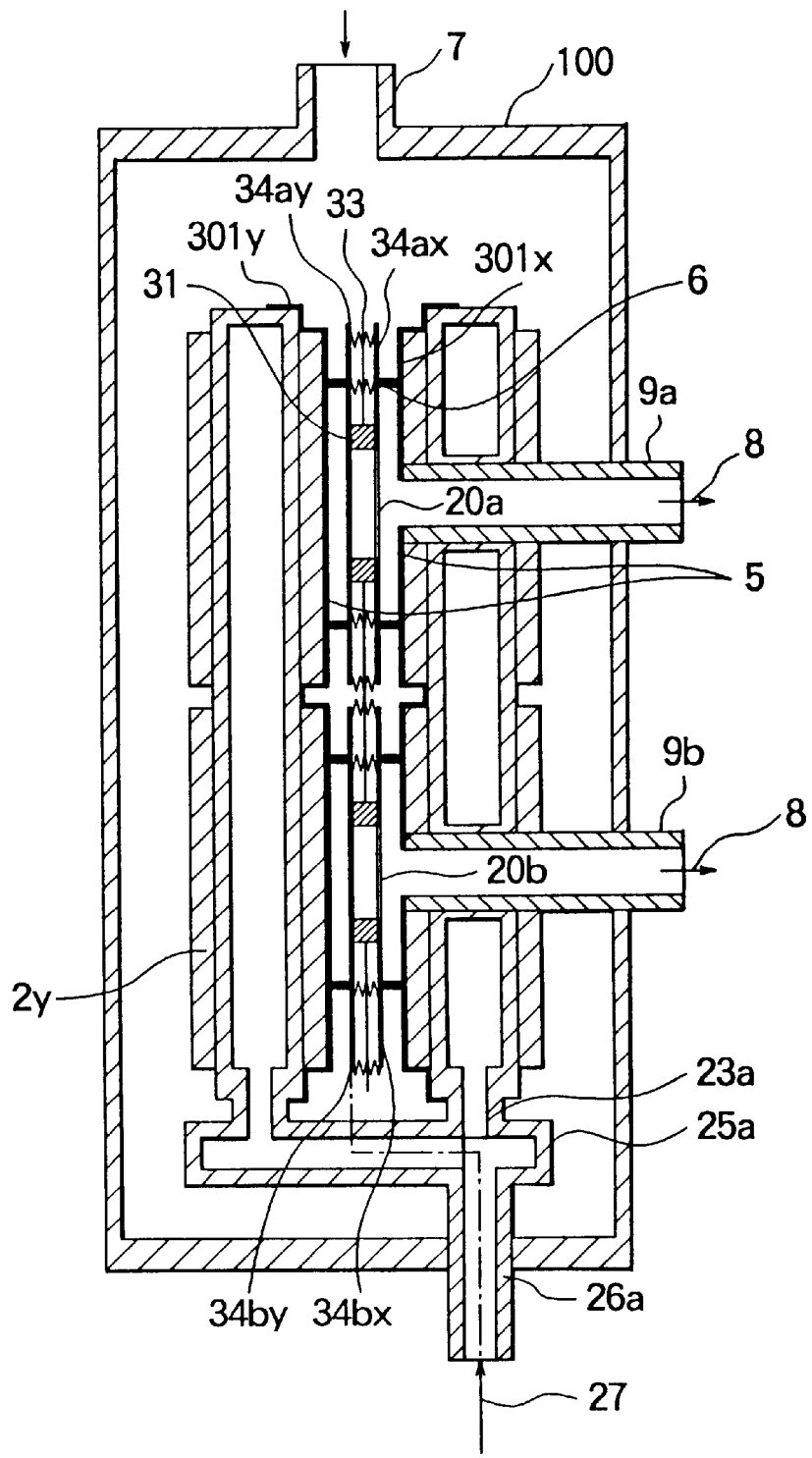
FIG. 5 is a sectional view showing a major portion of an ozone generating apparatus according to a third embodiment of the present invention.

FIG. 5 is a sectional view showing a major portion of an ozone generating apparatus according to a third embodiment of the present invention. The ozone generating apparatus of the instant embodiment includes common dielectric films 301x and 301y formed on the discharge surfaces of the common earth electrodes 2x and 2y, respectively. More specifically, the three disk-like dielectric members 300a, 300b and 300c of the ozone generating apparatus shown in FIG. 4 are replaced by the common dielectric films 301x and 301y which are formed over the whole discharge surfaces of the earth electrodes 2x and 2y, respectively, whereby the earth electrodes provided with the common dielectric films 301x and 301y are realized. In this conjunction, the common dielectric films 301x and 301y should preferably be so formed as to contact intimately with the earth electrodes 2x and 2y, respectively, by resorting to metallizing or spraying process, so that the mechanical strength as well as the flatness of high precision can be ensured by the earth electrodes 2x and 2y notwithstanding large area thereof.

Thus, in the ozone generating apparatus according to the instant embodiment of the invention, the common dielectric film 301x and three high-voltage electrodes 34ax, 34bx and 34cx are disposed in opposition the common earth electrode 2x whereby three discharge cells are realized. This structure is equally advantageous in realizing the ozone generating apparatus with a large capacity, similarly to the ozone generating apparatus according to the first embodiment.

Embodiment 4

Figure 6:
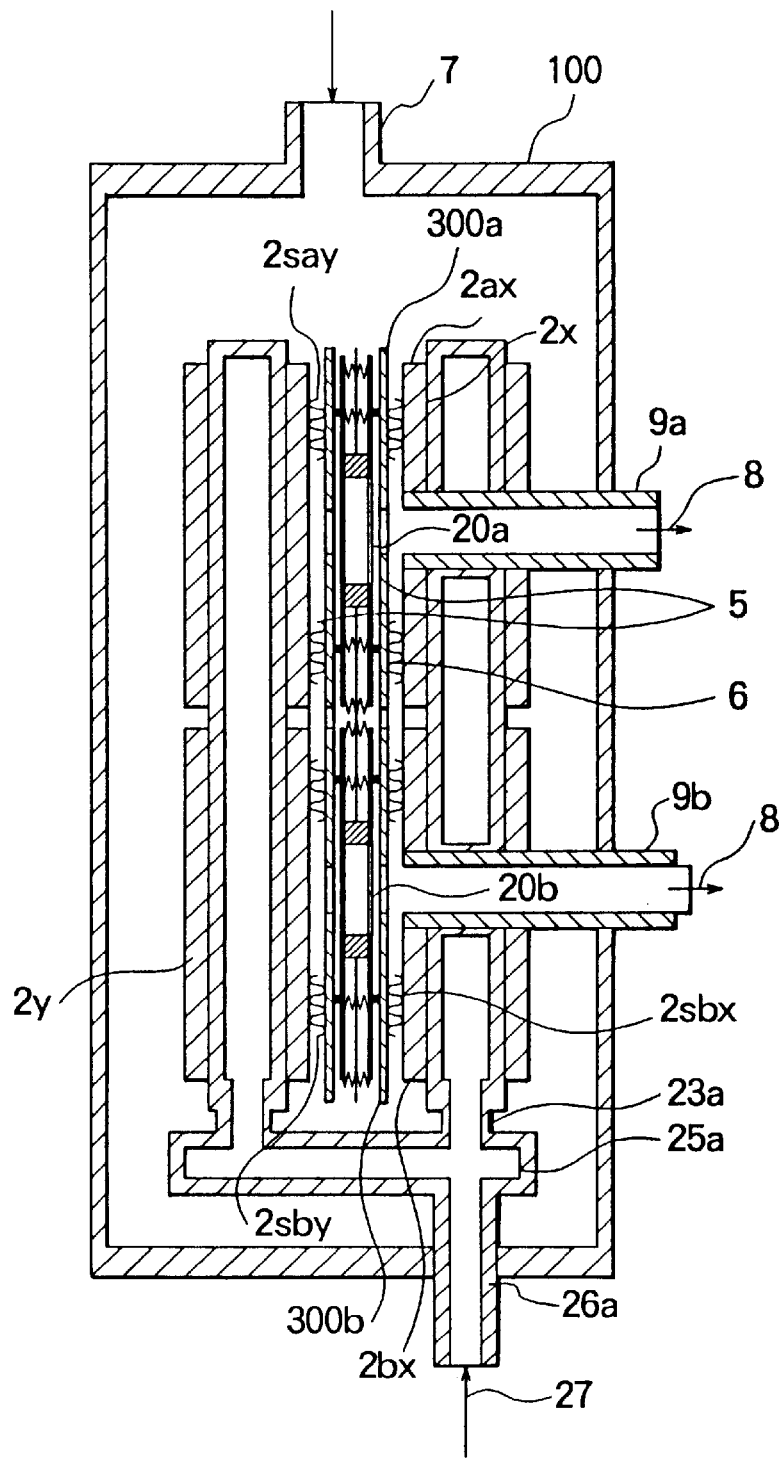
FIG. 6 is a sectional view showing a major portion of an ozone generating apparatus according to a fourth embodiment of the present invention.

FIG. 6 is a sectional view showing a major portion of an ozone generating apparatus according to a fourth embodiment of the present invention. Referring to the figure, the ozone generating apparatus of the instant embodiment includes spring sealing plates 2sax, 2sbx, 2say and 2sby. The spring sealing plates 2sax, 2sbx and 2scx (the spring sealing plates 2scx is not shown) are sandwiched between the electrically conductive films of the disk-like dielectric members 300a, 300b and 300c (300c is not shown) which are formed on one surfaces of the disk-like dielectric members 300a, 300b and 300c according to the second embodiment shown in FIG. 4 and the electrically conductive members 2ax, 2bx and 2cx (2cx is not shown) of the earth electrode 2x, to serve for improving the electrical contact between the surfaces of the electrically conductive films of the disk-like dielectric members 300a, 300b and 300c and the earth electrode 2x, while preventing leakage of the gas between the disk-like dielectric members 300a, 300b and 300c and the common earth electrode 2x and serving additionally as the damper members for the disk-like dielectric members 300a, 300b and 300c.

Figure 7:
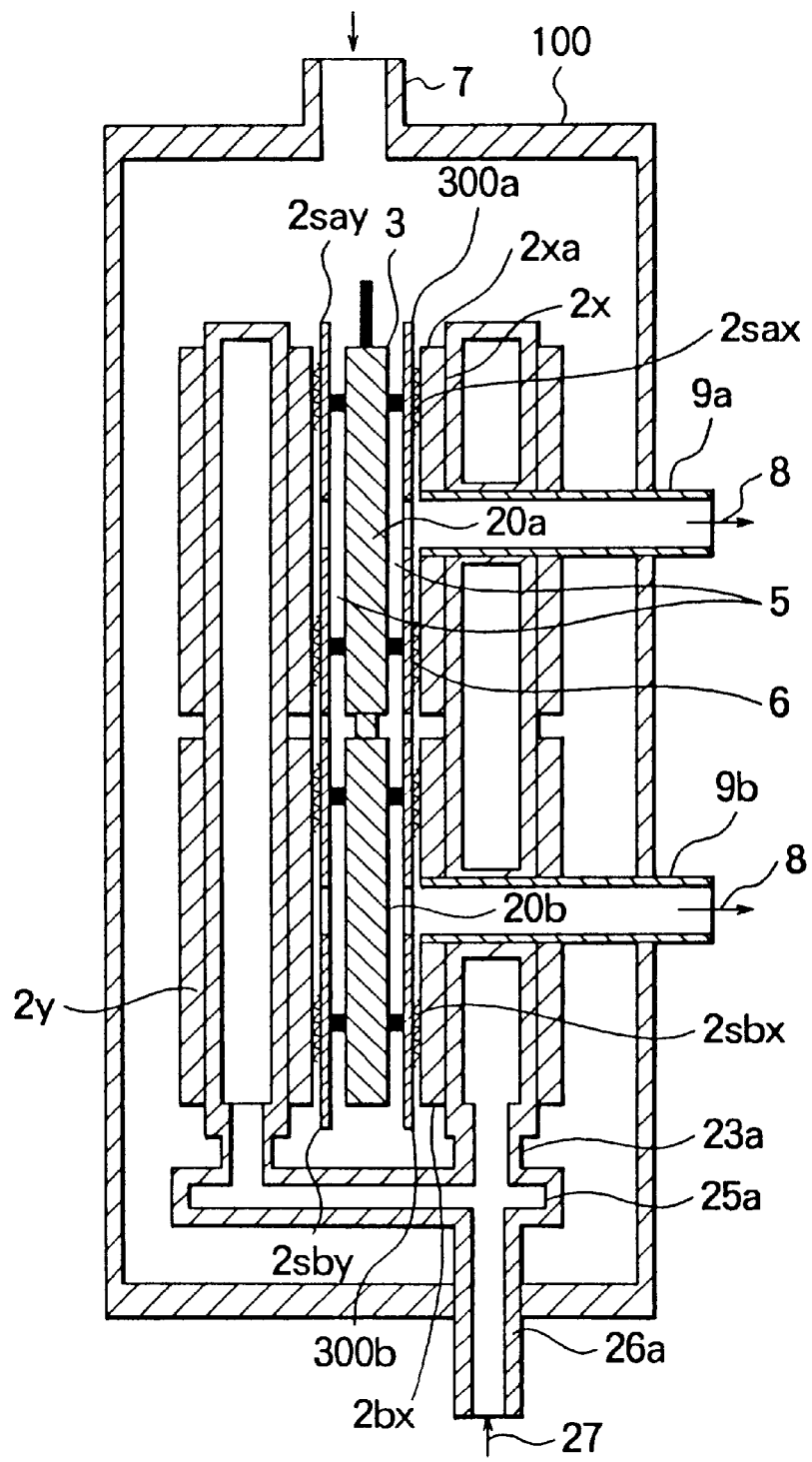
FIG. 7 is a sectional view showing a major portion of another ozone generating apparatus according to a fourth embodiment of the present invention.

In the ozone generating apparatus shown in FIG. 6, the high-voltage electrode assembly is constituted by four kinds of parts, i.e., the dielectric high-voltage electrodes 3ax, 3bx and 3cx (the disk-like high-voltage electrode 34cx being omitted from illustration), the metal springs 32, the gas sealing members 31 and the electric feeder plates 33. However, the high-voltage electrode may be constituted by a single high-voltage electrode body 3, as shown in FIG. 7. In that case, the common high-voltage electrode 3 and the disk-like dielectric members 300a, 300b and 300c (300c not shown) having respective one surfaces formed with electrically conductive films are disposed in opposition to the common earth electrode 2x to thereby constitute three discharge cells. The structure of the ozone generating apparatus mentioned just above is profitably suited for the implementation with a large capacity, as in the case of the ozone generating apparatus according to the instant embodiment of the invention.

Embodiment 5

Figure 8:
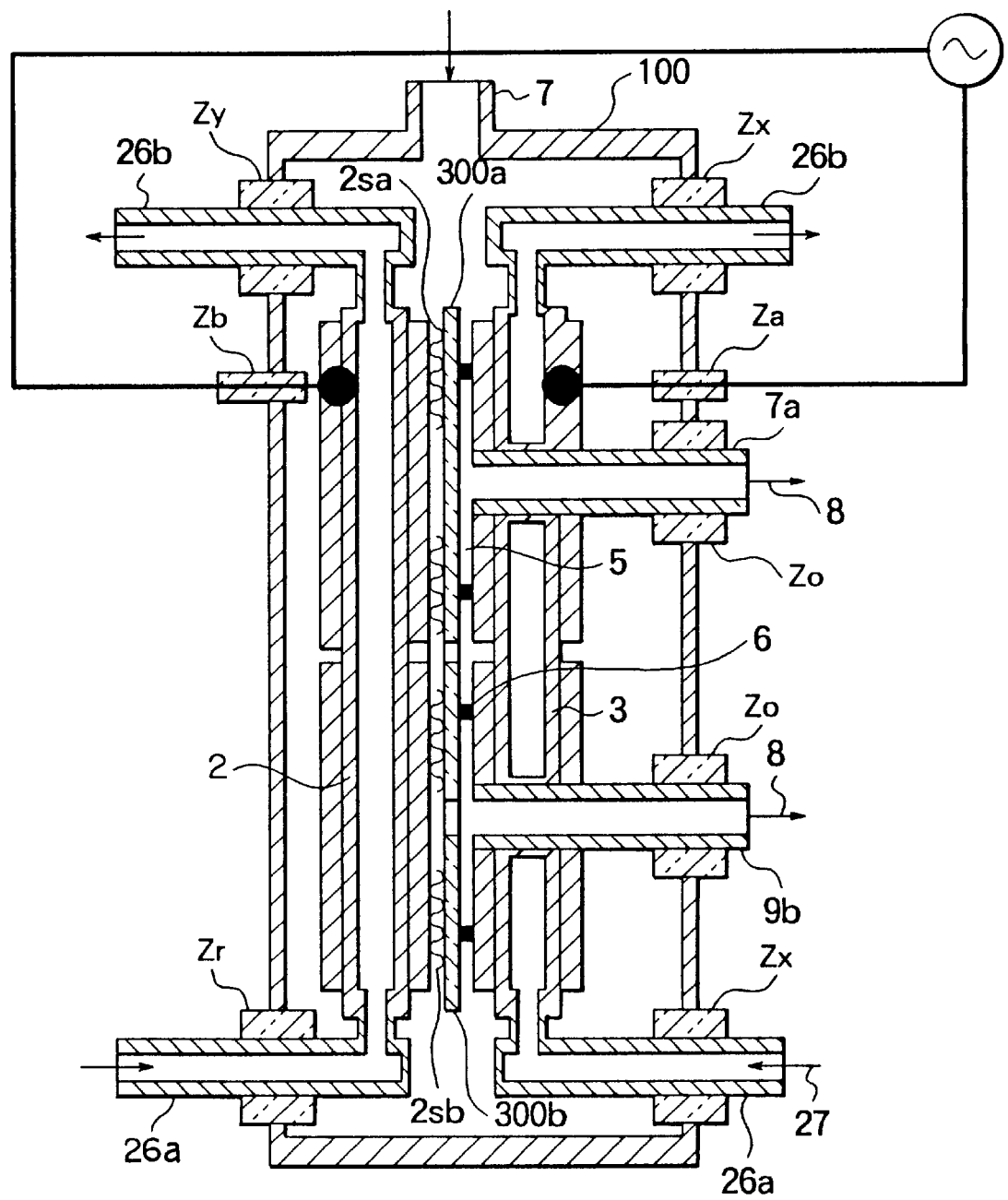
FIG. 8 is a sectional view showing a major portion of an ozone generating apparatus according to a fifth embodiment of the present invention.

FIG. 8 is a sectional view showing a major portion of an ozone generating apparatus according to a fifth embodiment of the present invention. Referring to the figure, the ozone generating apparatus includes insulation rings Zx and Zy for the cooling pipes 26a and 26b, insulation rings Zo for the ozonized-gas discharge pipes 9a and 9b, respectively, lead-in insulators Za, Zb for the voltage supply lines, a high-voltage power source 1 and spring sealing plates 2sa and 2sb. The structure of the ozone generating apparatus is essentially same as that shown in FIG. 7 except that each of the high-voltage electrodes 3 is so implemented as to form a hollow portion or passage through which the cooling medium or water can flow.

In the ozone generating apparatus according to the instant embodiment of the invention, the pressure vessel 100 and the two electrodes 2 and 3 are electrically insulated from each other by means of the insulation rings. Each of the electrodes 2 and 3 is realized in the structure adapted to be cooled by the cooling medium or water. More specifically, both surfaces of the electrode are cooled by water.

By virtue of the arrangement for cooling both the electrodes 2 and 3, the cooling efficiency of the gas within the discharge spaces 5 is enhanced, whereby ozone can be produced with high concentration, to an advantageous effect.

Embodiment 6

Figure 9:
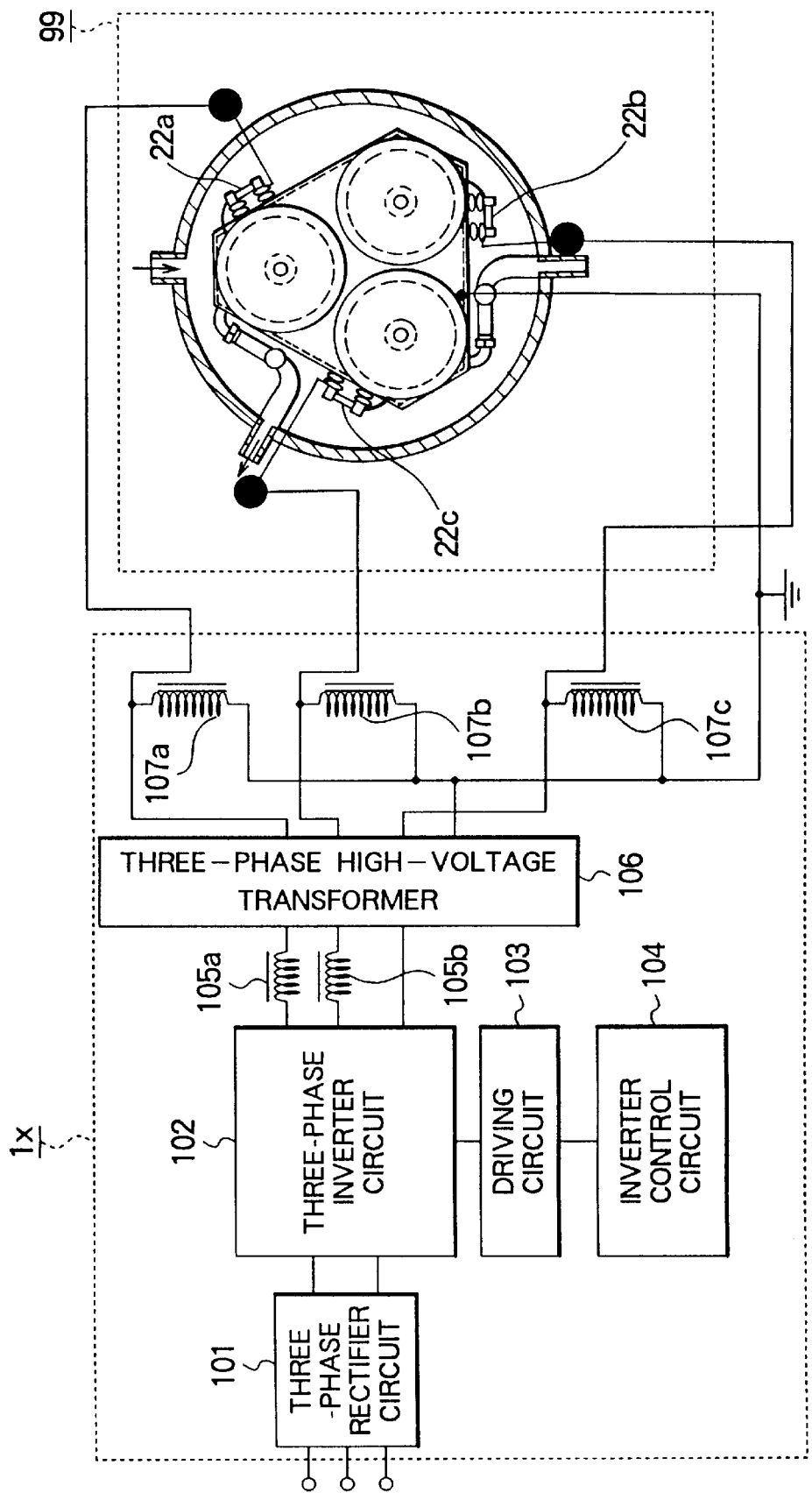
FIG. 9 is a schematic view showing a configuration of an ozone generating apparatus, discriminatively an ozone generating apparatus body and a power supply circuit according to a sixth embodiment of the present invention.

FIG. 9 is a schematic view showing a configuration of an ozone generating system including an ozone generating apparatus and a power supply circuit according to a sixth embodiment of the present invention. The ozone generating apparatus may be same as that shown in FIG. 1. On the other hand, the power supply circuit of the ozone generating system includes an ozone generating power source 1x which is constituted by a three-phase AC generation circuit for accommodating the three ozone generating power sources 1a, 1b and 1c in the ozone generating apparatus according to the first embodiment. To this end, the ozone generating power source 1x is constituted by a three-phase rectifier circuit 101, a three-phase inverter circuit 102, a driving circuit 103 for the three-hase inverter circuit 102, an inverter control circuit 104 for the three-phase inverter circuit 102, serial reactors 105a and 105b, a three-phase high-voltage transformer 106, and parallel reactors 107a, 107b and 107c.

In the case of the ozone generating power source 1*x* shown in FIG. 9, the functions of the converter for making variable the voltage and the current are realized by the control for the three-phase inverter circuit 102. It will however be understood that a converter circuit may additionally be provided in a stage preceding or succeeding to the three-phase inverter circuit 102.

Operation of the ozone generating power source 1*x* will be elucidated below. Referring to FIG. 9, the three-phase rectifier circuit 101 converts three-phase AC voltages of a commercial frequency once into DC voltages, which are then converted into three-phase AC voltages of 10 kHz by the three-phase inverter circuit 102 to be applied to the inputs of the three-phase high-voltage transformer 106 by way of the serial reactors 105*a* and 105*b*. The three-phase high-voltage transformer 106 has primary windings of delta (Δ) connection and secondary windings of star (Y) connection, wherein the primary voltage is boosted up to a high secondary voltage. The neutral point of the star (Y) connection is coupled to the ground potential. To this end, the neutral point of the star connection can be connected to the earth electrode 2 of the ozone generator 10. High voltages of different phases are applied to the individual ozone generating discharge cells from the high-voltage output terminals of the secondary windings of the three-phase high-voltage transformer 106 by way of the overcurrent protecting fuses 22*a*, 22*b* and 22*c*, respectively.

The parallel reactors 107*a*, 107*b* and 107*c* are inserted between the neutral point (grounded terminal) and the high-voltage terminals of the three-phase high-voltage transformer 106, respectively. The parallel reactors 107*a*, 107*b* and 107*c* and the serial reactors 05*a* and 105*b* play a role for improving the power-factor for discharge load of the ozone generator main body 99 (which is equivalent to the ozone generating apparatus).

Although the serial reactors 105*a* and 105*b* are inserted at the primary side of the three-phase high-voltage transformer 106, they may be inserted at the secondary side, substantially to the same effect.

By implementing the ozone generating power source 1*x* in the form of the three-phase AC generating circuit, three ozone generating discharge cells can be driven with a single power source. Thus, the power source can be implemented inexpensively on a small scale.

Additionally, the power source requires no more than two serial reactors 105*a* and 105*b* and only one three-phase high-voltage transformer 106.

Embodiment 7

Figure 10:
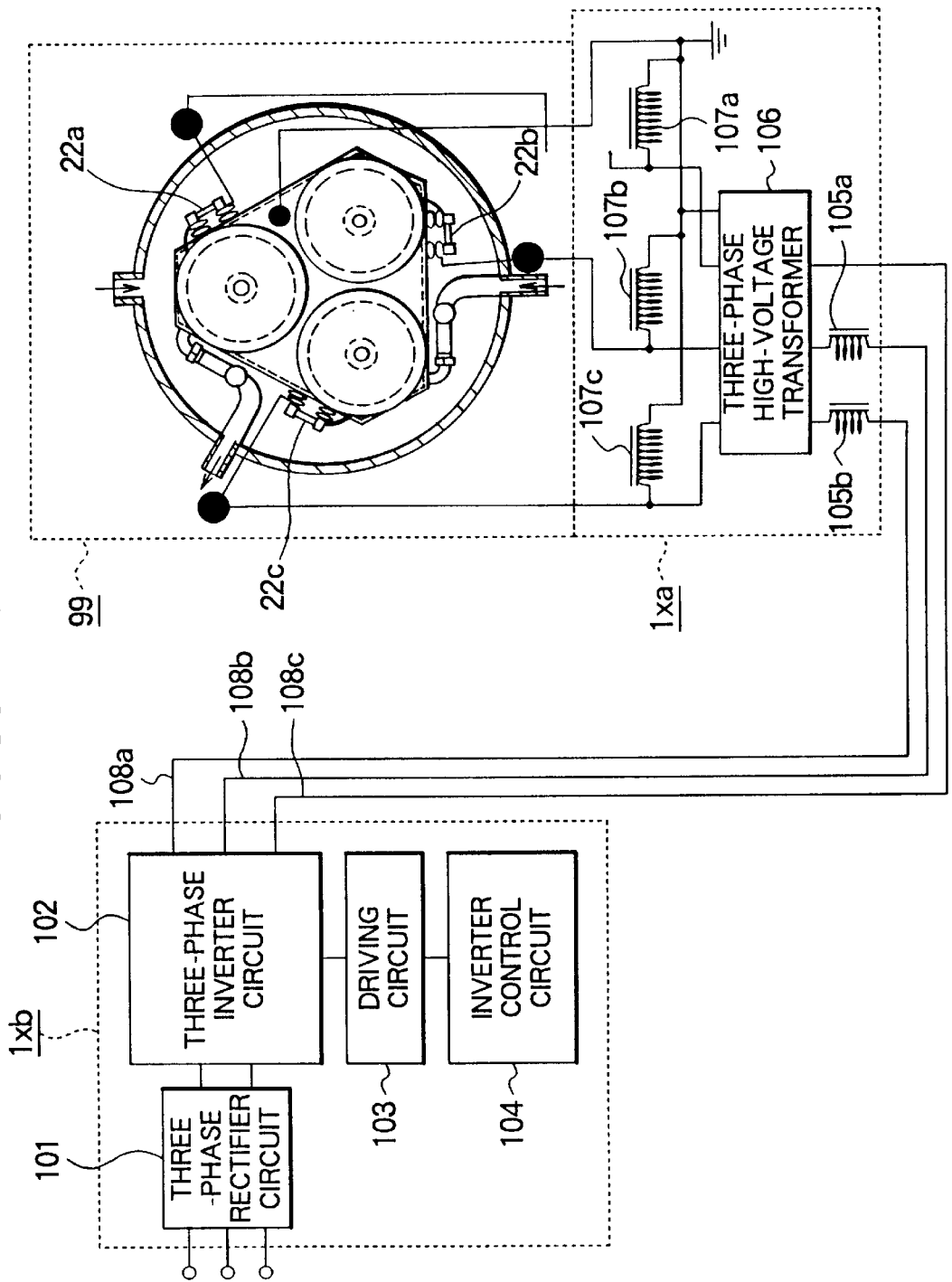
FIG. 10 is a schematic view showing a configuration of an ozone generating apparatus, discriminatively an ozone generating apparatus body and a power supply circuit according to a seventh embodiment of the present invention.

FIG. 10 is a schematic view showing a configuration of an ozone generating system including an ozone generating apparatus and a power supply circuit according to a seventh embodiment of the present invention In the case of the instant embodiment, the ozone generating power source 1*x* is separated into a high-voltages generating circuit 1*xa* for generating three-phase high voltages and a rectifier/inverter circuit 1*xb* for deriving three-phase high-frequency voltages.

The high-voltage generating circuit 1*xa* is constituted by the three-phase high-voltage transformer 106 of a large capacity, the reactors 105*a*, 105*b*, 107*a*, 107*b* and 107*c* and thus weights excessively, while the secondary voltage of the transformer 106 is high. Consequently, the structure of the ozone generator main body 99 and the high-voltage generating circuit 1*xa* should preferably be integrally combined with each other. With such integral combination, the location for the high-voltage wiring Is spatially limited. Furthermore, the wiring distance from the high-voltage generating circuit 1*xa* to the ozone generator main body 99 can be shortened, which is advantageous for suppressing failures such as leakages which may take place among the wires in the form of corona discharge, creeping discharge or the like.

By contrast, voltages at the output lines 108*a*, 108*b* and 108*c* extending from the three-phase inverter circuit 102 are low. Thus, the wiring for the output lines 108*a*, 108*b* and 108*c* can be facilitated because the wiring distance can be increased. Besides, since the rectifier/inverter circuit 1*xb* can be implemented in light weight, it may be installed in a room different from that for the ozone generator main body 99.

Embodiment 8

Figure 11:
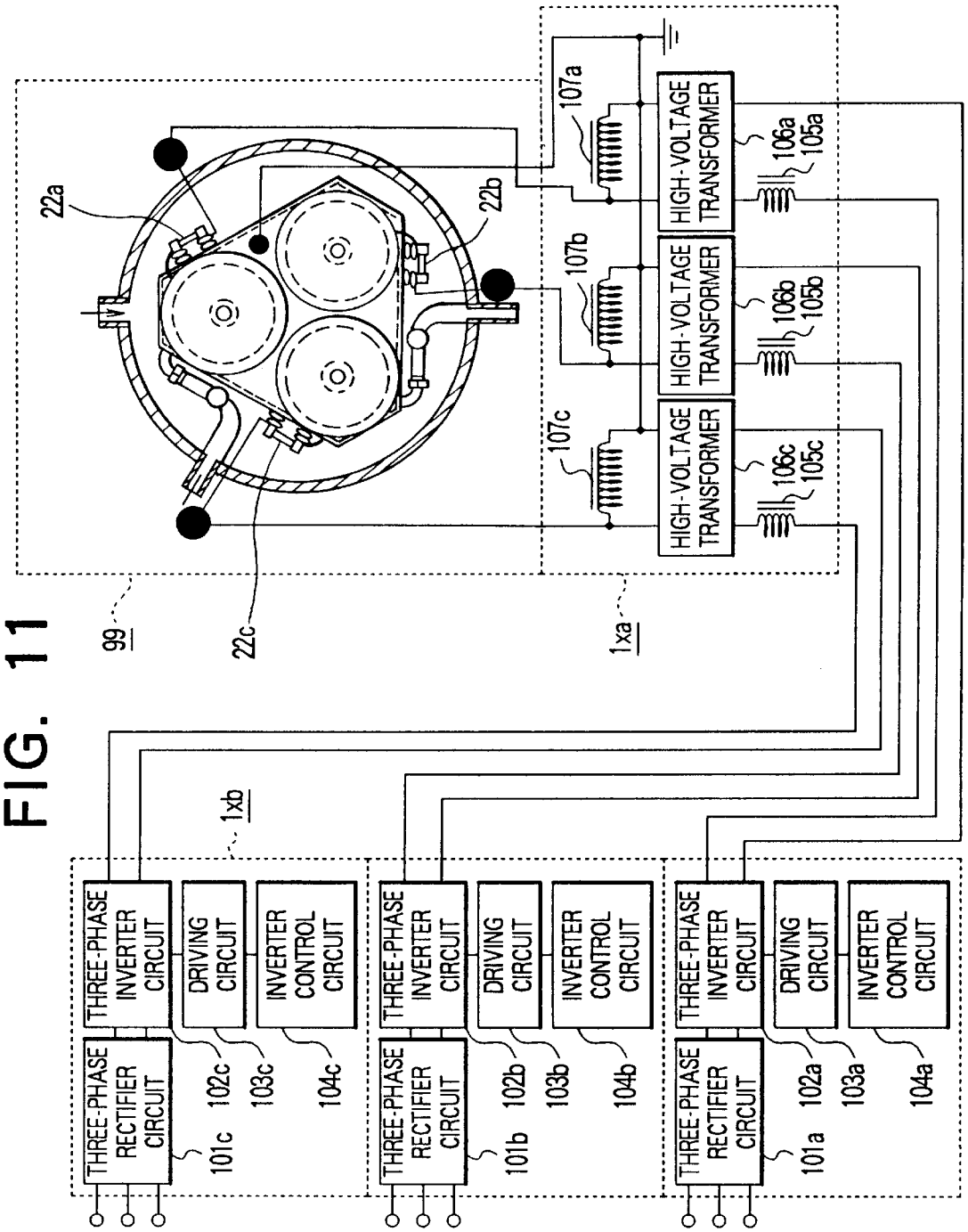
FIG. 11 is a schematic view showing a configuration of an ozone generating apparatus, discriminatively an ozone generating apparatus body and a power supply circuit according to an eighth seventh embodiment of the present invention.

In the case of the ozone generating system according to the seventh embodiment, the high-voltage generating circuit 1*xa* and the rectifier/inverter circuit 1*xb* which constitute the three-phase ozone generating power source are provided separately from each other. Such separation of the high-voltage generating circuit and the rectifier/inverter circuit can equally be adopted in the ozone generating system where three one-phase ozone generating power sources are employed, as shown in FIG. 11. Referring to FIG. 11, the power supply circuit of the ozone generating system includes three-phase rectifier circuits 101*a*, 101*b* and 101*c*, three-phase inverter circuits 102*a*, 102*b* and 102*c*, driving circuits 103*a*, 103*b* and 103*c*, inverter control circuits 104*a*, 104*b* and 104*c*, serial reactors 105*a*, 105*b* and 105*ac*, and three-phase high-voltage transformers 106*a*, 106*b* and 106*c*.

Additionally, in the cases of the seventh and eighth embodiments described above, the high-voltage generating circuit 1*xa* is provided separately from the three-phase rectifier circuits 101; 101*a*, 101*b* and 101*c*, the three-phase inverter circuits 102; 102*a*, 102*b* and 102*c*, and the driving circuits 103; 103*a*, 103*b* and 113*c*. However, the high-voltage generating circuit 1*xa*, the three-phase rectifier circuits 101; 101*a*, 101*b* and 101*c*, the three-phase inverter circuits 102; 102*a*, 102*b* and 102*c*, and the driving circuits 103; 103*a*, 103*b* and 103*c* may be integrally combined with the ozone generator main body 99, wherein only the inverter control circuits 104; 104*a*, 104*b* and 104*c* may be installed separately at a remote place for allowing a remote control of the system.

Embodiment 9

Figure 12:
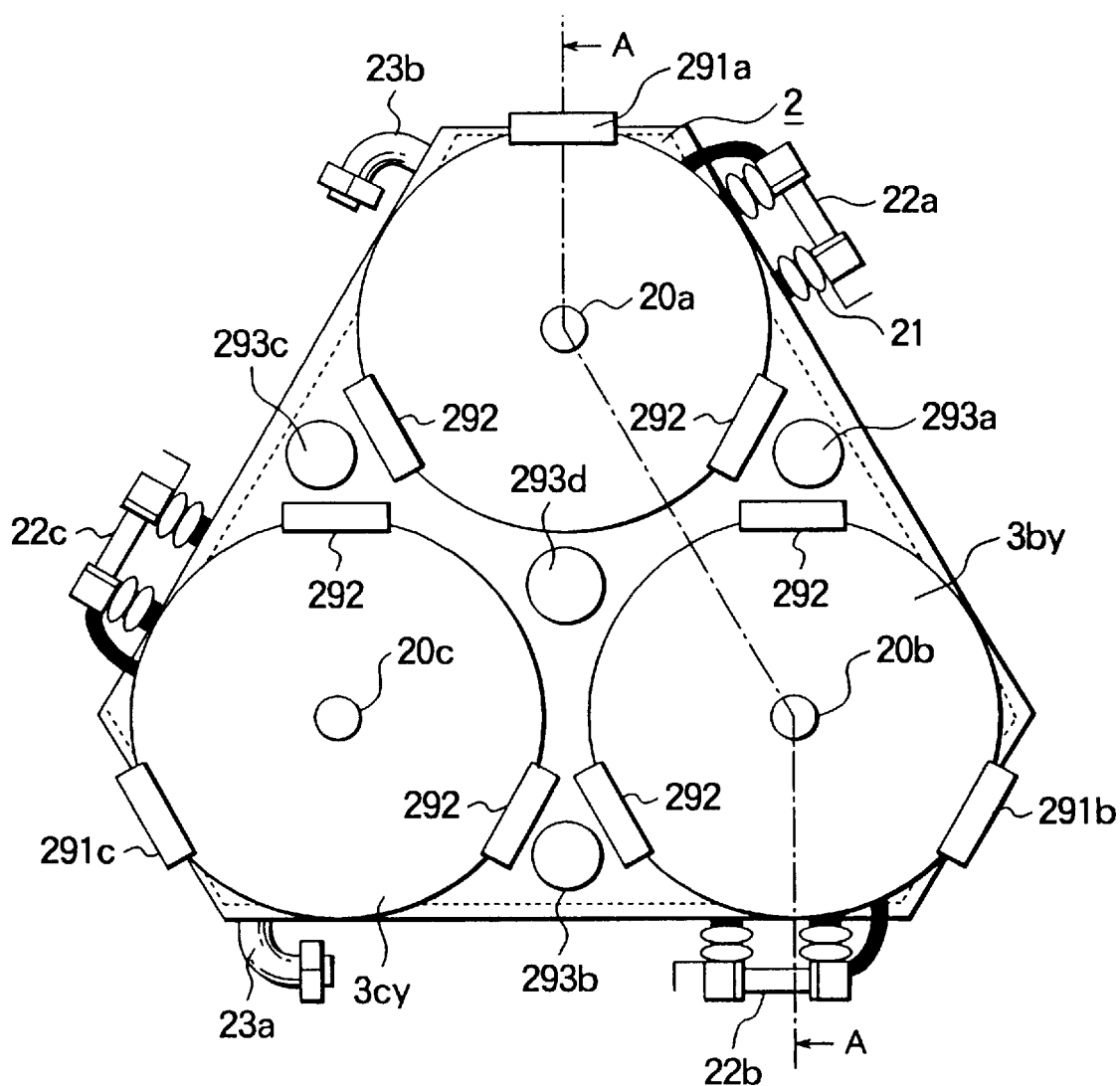
FIG. 12 is a plan view showing an ozone generating apparatus with some portions in section according to a ninth embodiment of the present invention.
Figure 13:
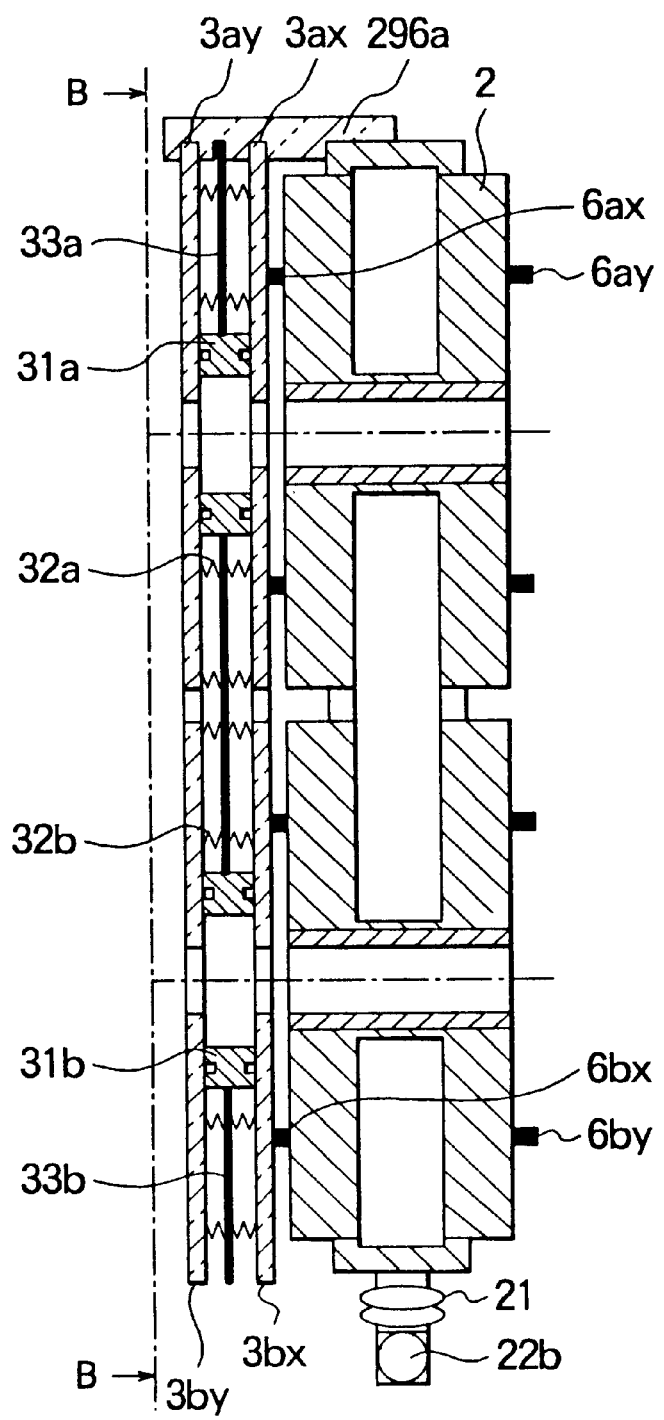
FIG. 13 is a sectional view showing a major portion of the ozone generating apparatus according to the ninth embodiment of the present invention.

FIGS. 12 and 13 show major portions of an ozone generating apparatus according to a ninth embodiment of the invention, wherein FIG. 12 is a plan view showing the ozone generating apparatus with some portions in section as viewed in the direction along a line B—B in FIG. 13 which in turn shows the same in a sectional view as viewed in the direction along a line A—A in FIG. 12.

In the ozone generating apparatus according to the instant embodiment of the invention, one earth electrode 2 is integrally combined with six dielectric high-voltage electrodes 3*ax*, 3*ay*, 3*bx*, 3*by*, 3*cx* and 3*cy* (the dielectric high-voltage electrodes 3*cx* and 3*cy* being omitted from illustration), six spacers 6*ax*, 6*bx*, 6*cx*, 6*ay*, 6*by* and 6*cy* (the spacers 6*cx* and 6*cy* being omitted from illustration), three gas sealing members 31*a*, 31*b* and 31*c* (31*c* being omitted from illustration), three spring members 32*a*, 32*b* and 32*c* (32*c* being omitted from illustration), and three electric feeder plates 33*a*, 33*b* and 33*c* (33*c* being omitted from illustration).

The six spacers 6*ax*, 6*bx*, 6*c* 6*ay*, 6*by* and 6*cy* are implemented integrally with the earth electrode 2, while the spring members 32a, 32b and 32c and the gas sealing members 31a, 31b and 31c are integrally secured to the electric feeder plates 33a, 33b and 33c, respectively, by spot welding or set screws. The dielectric high-voltage electrodes 3ax, 3ay, 3bx, 3by, 3cx and 3cy and the electric feeder plates 33a, 33b and 33c are fixedly held at the outer periphery of the earth electrode 2 by means of holding members (A) 291a, 291b and 291c, while the dielectric high-voltage electrodes 3ax, 3ay, 3bx, 3by, 3cx and 3cy and the electric feeder plates 33a, 33b and 33c are fixedly secured to the earth electrode 2 by means of holding members (B) 292. The non-discharging surface of the earth electrode 2 is provided with through-holes 293a, 293b, 293c and 293d for allowing coupling rods to extend therethrough when a plurality of ozone generating discharge units or assemblies are stacked in a multi-stage structure.

The assemblies of the electric feeder plates 33a, 33b and 33c combined integrally with the spring members 32a, 32b and 32c and the gas sealing members 31a, 31b and 31c and sandwiched between the dielectric high-voltage electrodes are fixedly secured to the earth electrode 2 combined integrally with the spacers 6ax, 6bx, 6cx, 6ay, 6by and 6cy by means of the holding members (A) 291a, 291b and 291c and the holding members (B) 292.

By combining pluralities of dielectric members, high-voltage electrodes and the spacers integrally with the common earth electrode, a plurality of discharge cells can be handled as a single discharge unit or assembly, whereby a plurality of the discharge units or assemblies can be easily stacked. Besides, by exchanging the integral earth electrode as a whole for maintenance, the work required therefor can be achieved within very short time.

Figure 14:
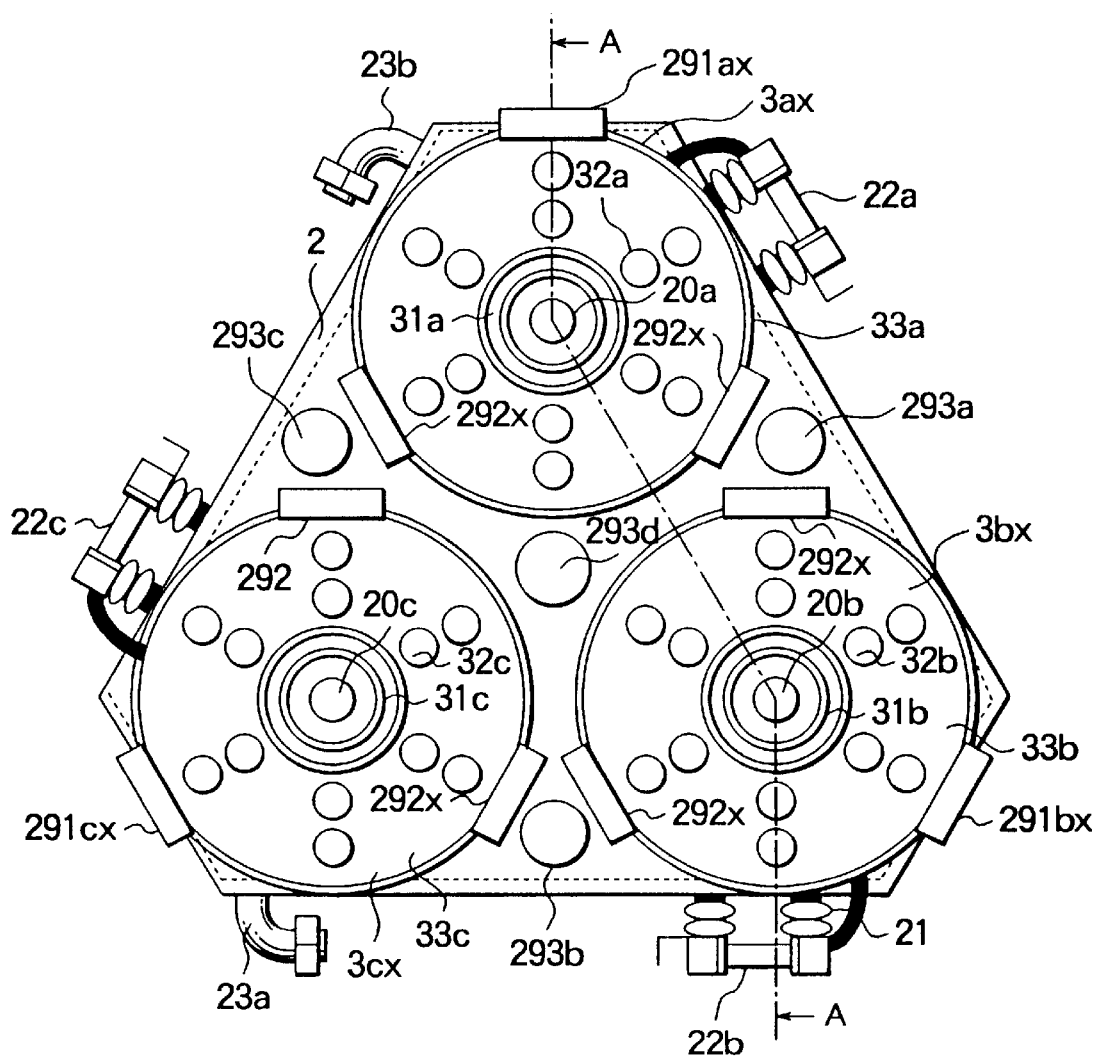
FIG. 14 is a plan view showing another structure of the ozone generating apparatus according to the ninth embodiment of the present invention.
Figure 15:
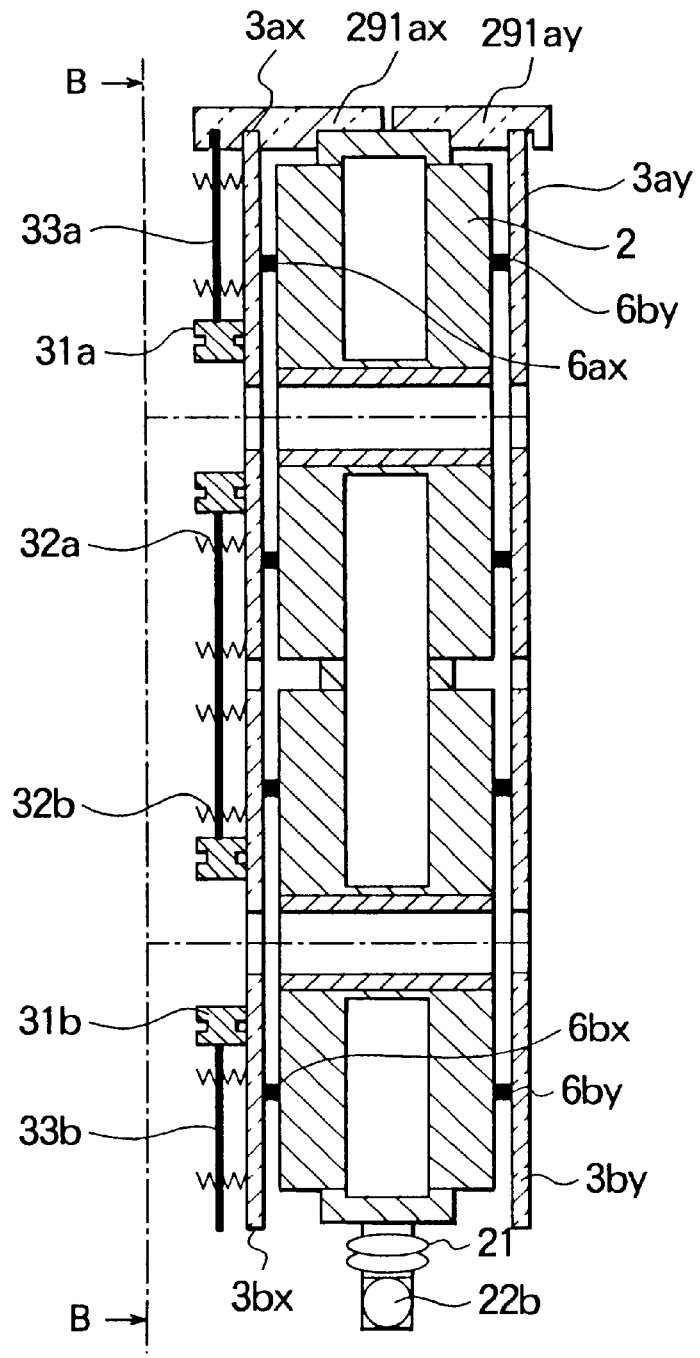
FIG. 15 is a sectional view showing a major portion of a modified ozone generating apparatus according to the ninth embodiment of the present invention.

Parenthetically, the assemblies of the electric feeder plates 33a, 33b and 33c combined integrally with the spring members 32a, 32b and 32c and the gas sealing members 31a, 31b and 31c and sandwiched between the dielectric high-voltage electrodes 3ax, 3ay, 3bx, 3by; and 3cx, 3cy, respectively, are disposed on one surface of the earth electrode 2, as shown in FIGS. 12 and 13. However, the electric feeder plates 33a, 33b and 33c and the dielectric high-voltage electrodes 3ax, 3bx and 3cx may be fixedly secured by means of the holding members 291ax, 291bx, 291cx and 292x to one surface of the earth electrode 2, while the dielectric high-voltage electrodes 3ay, 3by and 3cy may be fixedly secured by means of the holding members 291ay, 291by, 291cy and 292y (291by, 291cy and 292y being omitted from illustration) to the other surface of the earth electrode 2, to thereby fix a plurality of dielectric members, high-voltage electrodes and spacers, as shown in FIGS. 14 and 15 in a plan view and a sectional view, respectively.

In the foregoing, it has been described that in the ozone generating apparatus in which the three dielectric high-voltage electrodes 3a, 3b and 3c are juxtaposed in opposition to the common earth electrode to thereby realize the three discharge cells, the dielectric members, the high-voltage electrodes and the spacers are integrally combined with the earth electrode. It should however be appreciated that in the ozone generating apparatus in which one high-voltage electrode is disposed in opposition to one earth electrode, the dielectric member, high-voltage electrode and the spacer may be secured integrally to the earth electrode for facilitating stacking of the discharge cells and maintenance therefor.

Embodiment 10

Figure 16:
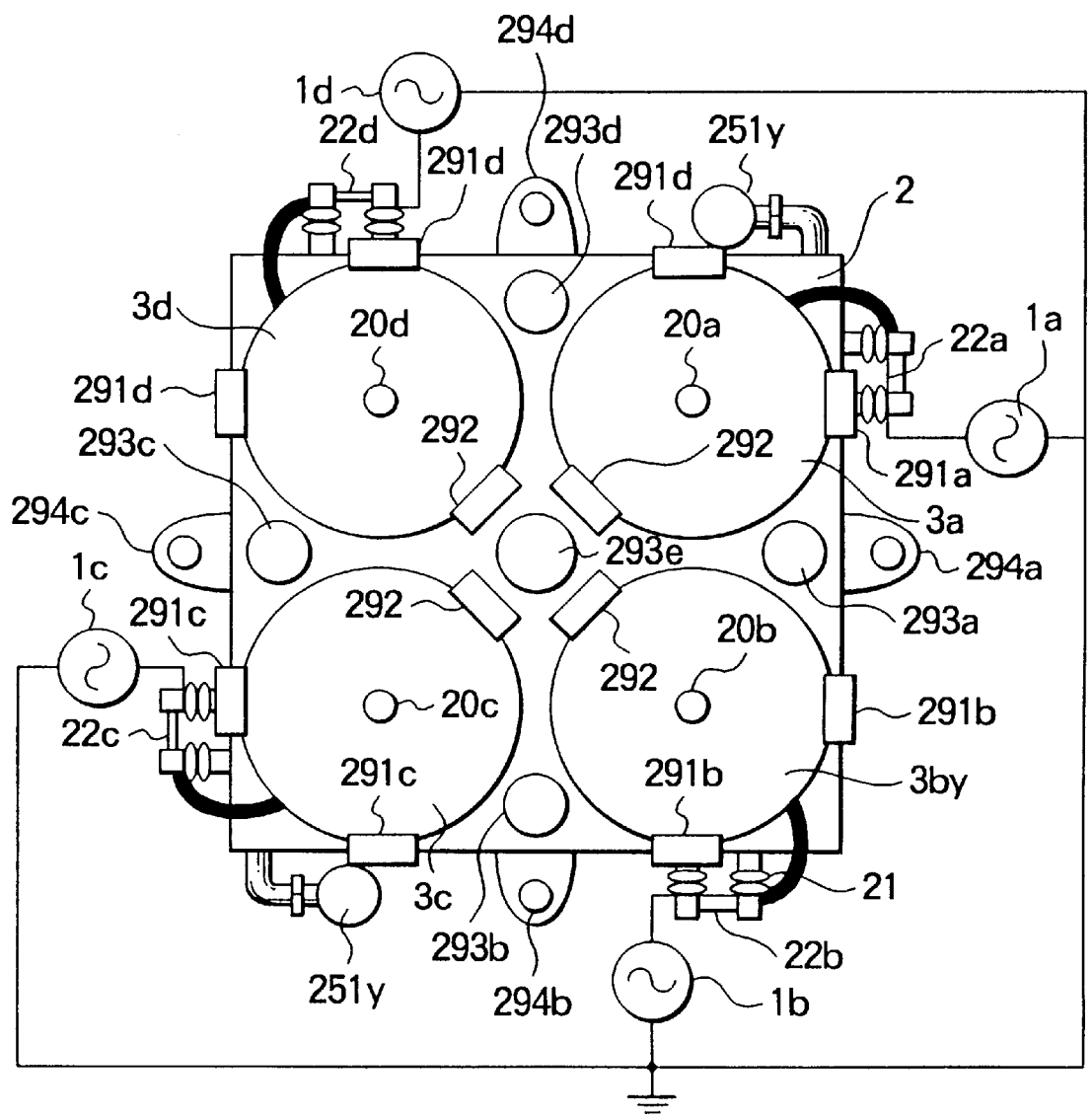
FIG. 16 is a schematic view showing an arrangement of a major portion of an ozone generating apparatus according to a tenth embodiment of the present invention.

FIG. 16 is a schematic view showing a major portion of an ozone generating apparatus according to a tenth embodiment of the present invention. As can be seen in the figure, the instant embodiment of the invention is directed to an ozone generating apparatus in which the common earth electrode 2 is shaped in a square form for defining four ozone generating discharge cells on one surface of one earth electrode 2. In FIG. 16, the ozone generating apparatus according to the instant embodiment of the invention is additionally provided with an ozone generating power source 1d, a dielectric high-voltage electrode 3d, a gas guide passage 20d, an overcurrent protecting fuse 22d, a holding member (A) 291d, a holding member (B) 292, a through-hole 293e and hooks 294a, 294b, 294c and 294d.

For stacking the discharge units in a multi-stage structure, coupling rods are inserted through the through-holes 293a, 293b, 293c, 293d and 293e formed in the non-discharge surface of the earth electrode 2 and the hooks 294a, 294b, 294c and 294d disposed on lateral sides of the earth electrode 2 and clamped by nuts, so that a predetermined distance can be set up between the individual discharge cells.

By implementing the common earth electrode 2 in a rectangular or square form as described above, the earth electrode 2 can be easily manufactured inexpensively, to another advantage.

Embodiment 11

Figure 17:
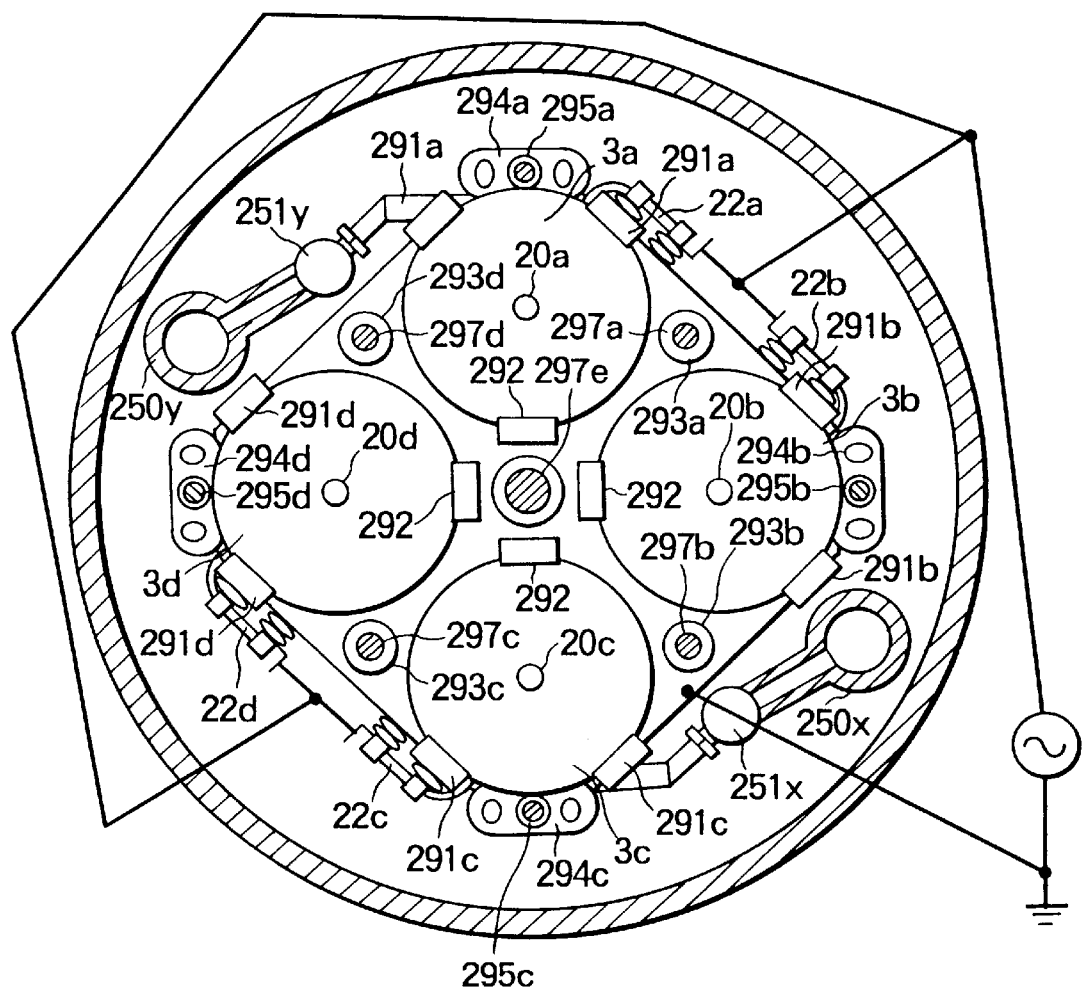
FIG. 17 is a schematic view showing an arrangement of a major portion of an ozone generating apparatus according to an eleventh embodiment of the present invention.

FIG. 17 is a schematic view showing a configuration of an ozone generating apparatus according to an eleventh embodiment of the present invention. Referring to the figure, the ozone generating apparatus of the instant embodiment is equipped with coolant header/relay tubes 251x and 251y and main coolant header tubes 250x and 250y for cooling the earth electrode, wherein cooling water is fed through the tubes 250x and 251x while it is discharged by way of the tubes 250x and 250y. In the figure, reference numeral 295a, 295b, 295c and 295d and 297a, 297b, 297c, 297d and 297e denote coupling rods.

In the case of the ozone generating apparatus according to the instant embodiment of the invention, the position of the earth electrode 2 is angularly displaced by 45 degrees from the position shown in FIG. 16, wherein the main coolant header tubes 250x and 250y and coolant header/relay tubes 251x and 251y for cooling the earth electrode 2 are disposed at one set of opposite sides of the rectangular earth electrode while the overcurrent protecting fuses 22a to 22d are mounted at other opposite sides of the earth electrode.

By angularly displacing the earth electrode 2 by 45° in this manner, the top portion of the earth electrode 2 from which cooling water is discharged becomes narrow, which is effective for preventing bubbles from being produced in the inner hollow space of the earth electrode 2.

Embodiment 12

Figure 18:
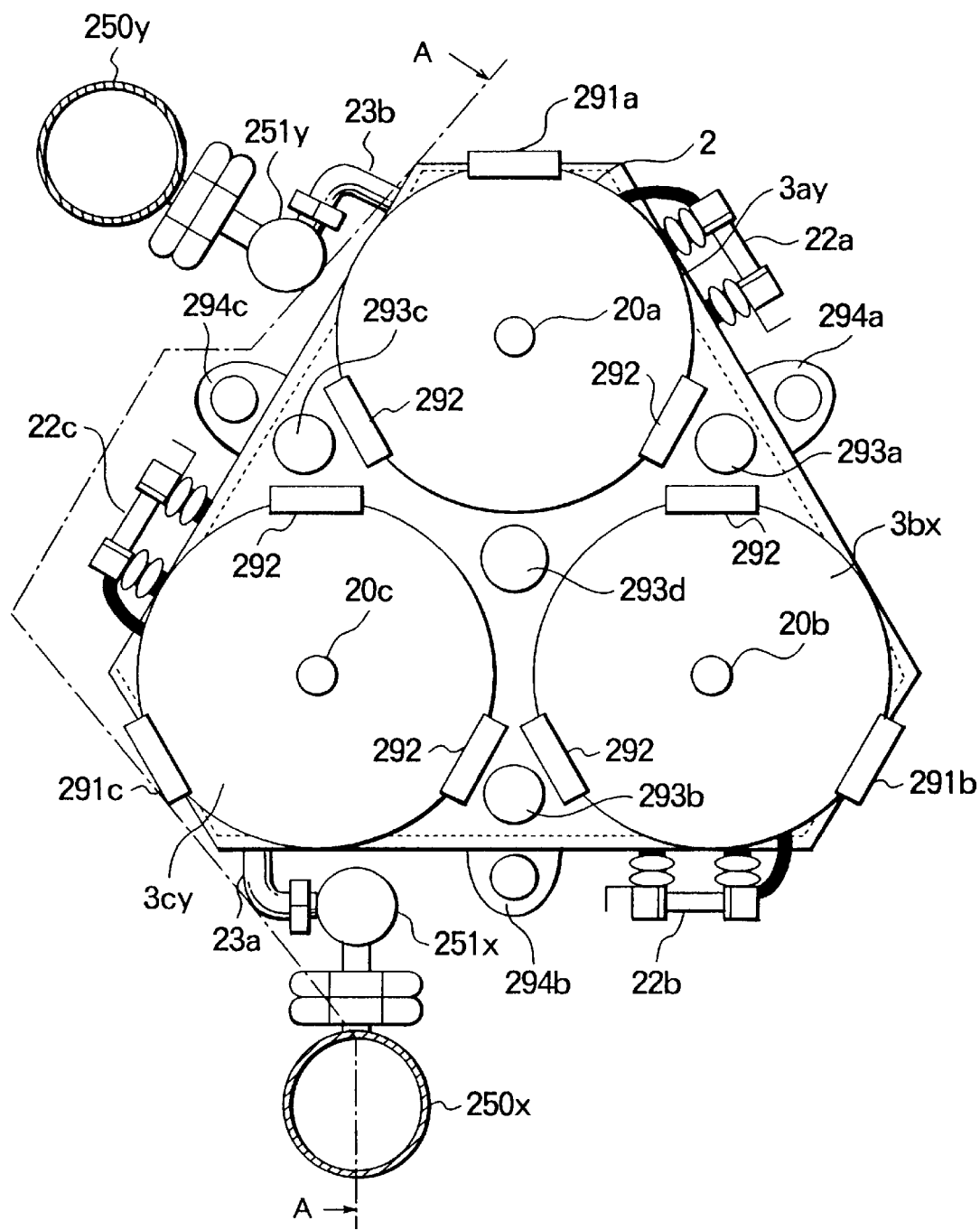
FIG. 18 is a plan view showing a major portion of an ozone generating apparatus according to a twelfth embodiment of the present invention with some portions.
Figure 19:
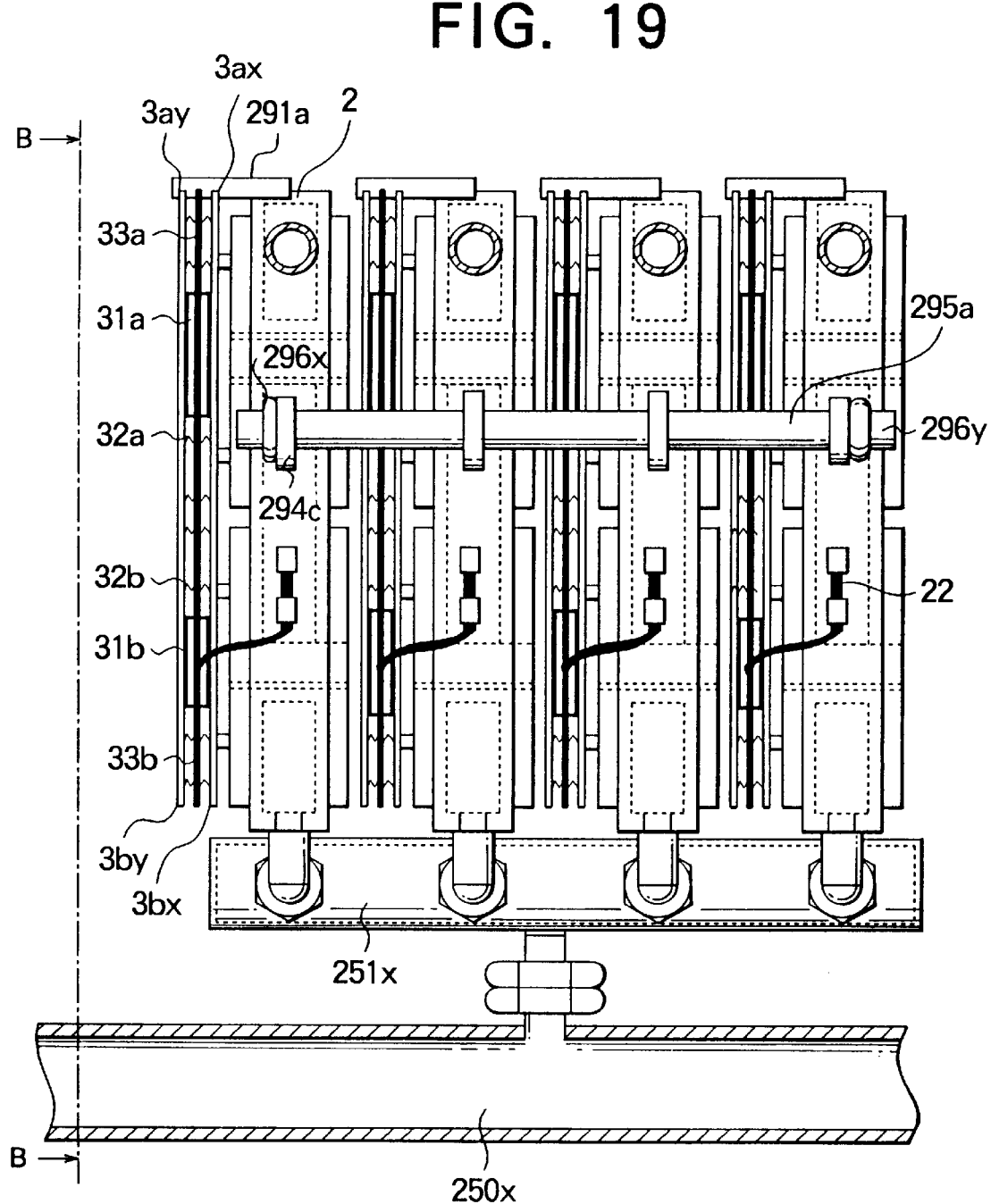
FIG. 19 is a sectional view showing a major portion of an ozone generating apparatus according to the twelfth embodiment of the invention.

FIGS. 18 and 19 are schematic views showing a configuration of an ozone generating apparatus according to a twelfth embodiment of the present invention. More specifically, FIG. 18 shows the ozone generating apparatus as viewed in the direction along arrowed line B—B in FIG. 19, while the latter shows the same as viewed in the direction along arrowed line A—A in FIG. 18. In the figures, reference characters 296x and 296y denote block clamping or locking nuts, respectively.

In the ozone generating apparatus according to the instant embodiment of the invention, four pair of the discharge units implemented integrally with the common earth electrode 2 as described hereinbefore in conjunction with the ninth embodiment are stacked together, whereon the block-locking coupling rods 295a, 295b and 295c (coupling rods 295b and 295c are not shown) are inserted through the hooks 294a, 294b and 294c and clamped by means of block locking nuts 296x and 296y, whereby an ozone generating discharging block including seven stages of stacked ozone generating units or discharge assemblies is constituted. A plurality of such ozone generating discharge blocks may be stacked and secured together by means of coupling rods inserted through-holes 293a, 293b, 293c and 293d for realizing an ozone generating apparatus of a larger capacity.

By stacking a plurality of ozone generating units or discharge assemblies into a block, it is possible to constitute the ozone generating apparatus module by stacking a plurality of blocks through a simple procedure within a short time when compared with the ozone generating apparatus according to the ninth embodiment where the discharge assemblies are shacked on a one-by-one basis.

Furthermore, upon occurrence of failure in one of the discharge cells, then the block including the discharge cell suffering the failure can be detached to be replaced by new one. Thus, maintenance can easily be carried out within a short time, whereby operation of the ozone generating system once interrupted can be quickly restored.

Besides, since the coolant header/relay tubes 251x and 251y are provided in association with each block, disconnection and connection of the coolant pipes for the maintenance can be accomplished speedily.

Additionally, by providing the coolant header/relay tubes 251x and 251y for every predetermined number of stages, the flow rate of water flowing through the earth electrodes and hence the cooling capability can be uniformized, whereby stable ozone generation performance can be ensured for each of the individual discharge cells.

Embodiment 13

Figure 20:
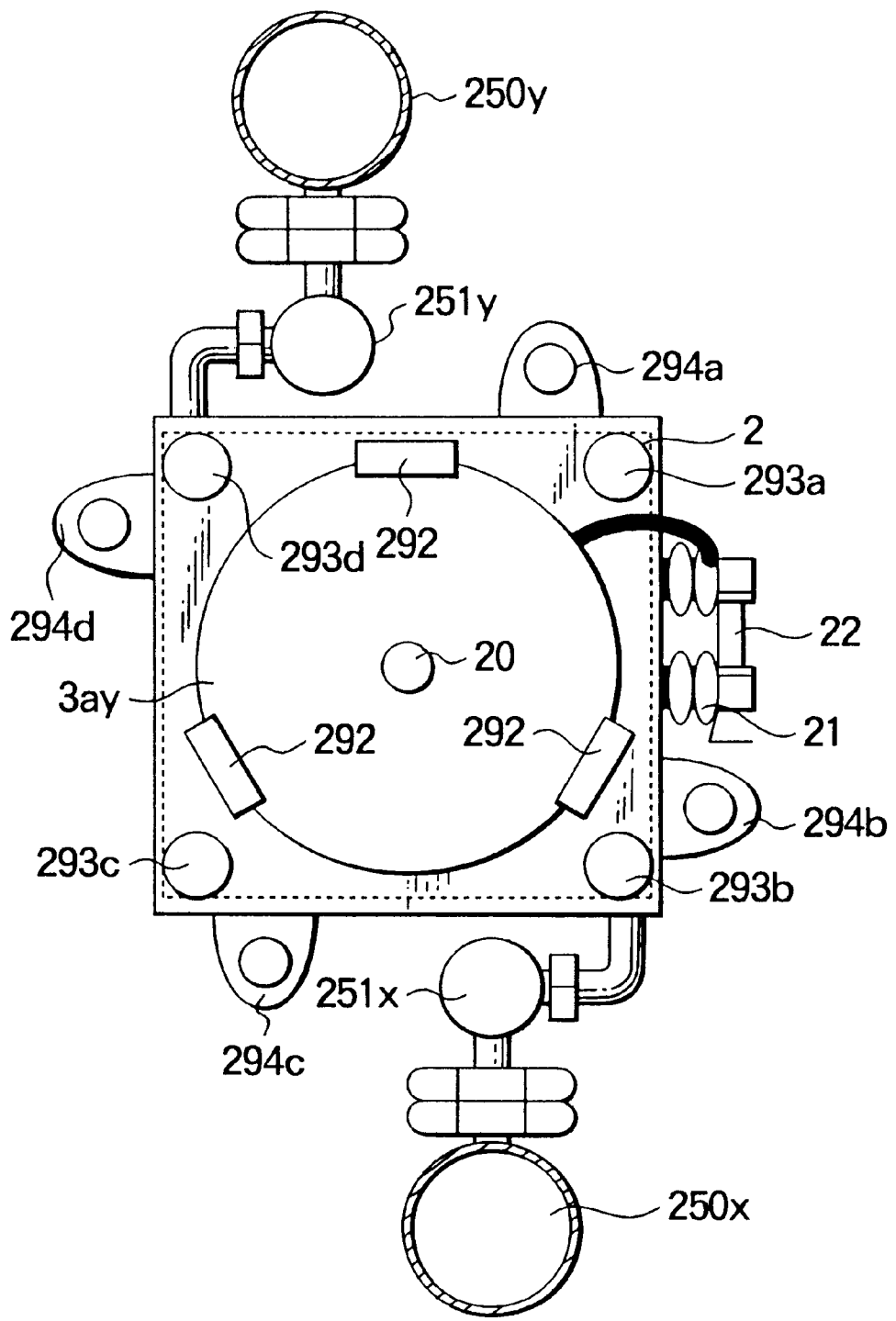
FIG. 20 is a plan view showing a major portion of an ozone generating apparatus according to a thirteenth embodiment of the present invention.
Figure 21:
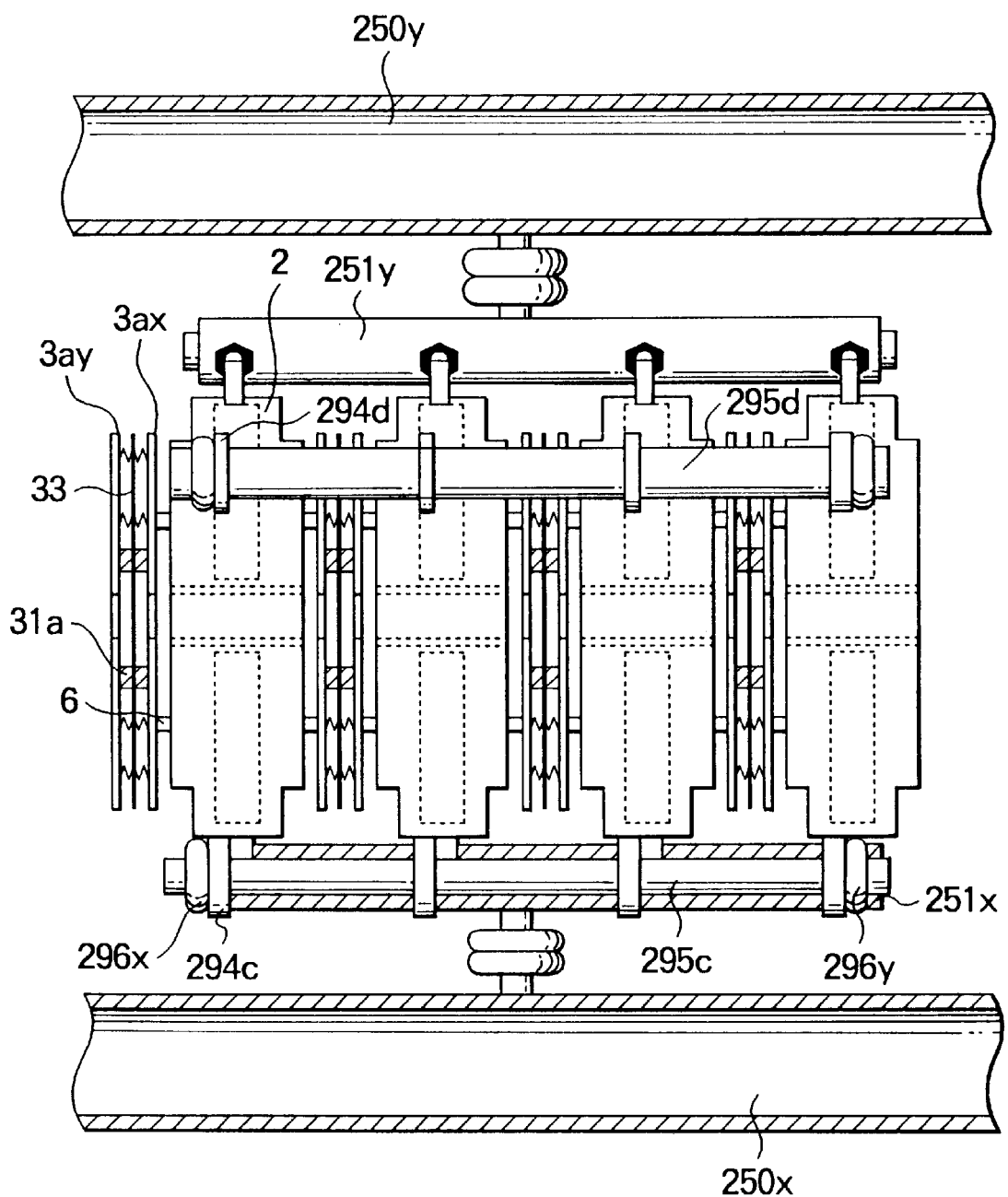
FIG. 21 is a sectional view showing a major portion of the ozone generating apparatus according to the thirteenth embodiment of the invention.

In the case of the ozone generating apparatus according to the twelfth embodiment of the invention, the discharge units or discharge assembly includes a plurality of discharge cells. According to a thirteenth embodiment of the invention, it is taught that a plurality of the discharge assemblies each constituted by one discharge cell are stacked together in multiple stages to thereby constitute an ozone generating discharge block, whereon a plurality of such discharge blocks are stacked and secured together to thereby constitute a module, as can be seen in FIGS. 20 and 21.

The ozone generating apparatus according to the instant embodiment of the invention can be equally enjoy such advantageous effect that the stacking of discharge cells and blocks, disassembling of the apparatus and exchange of the discharge blocks can easily be accomplished without taking lots of time.

Embodiment 14

Figure 22:
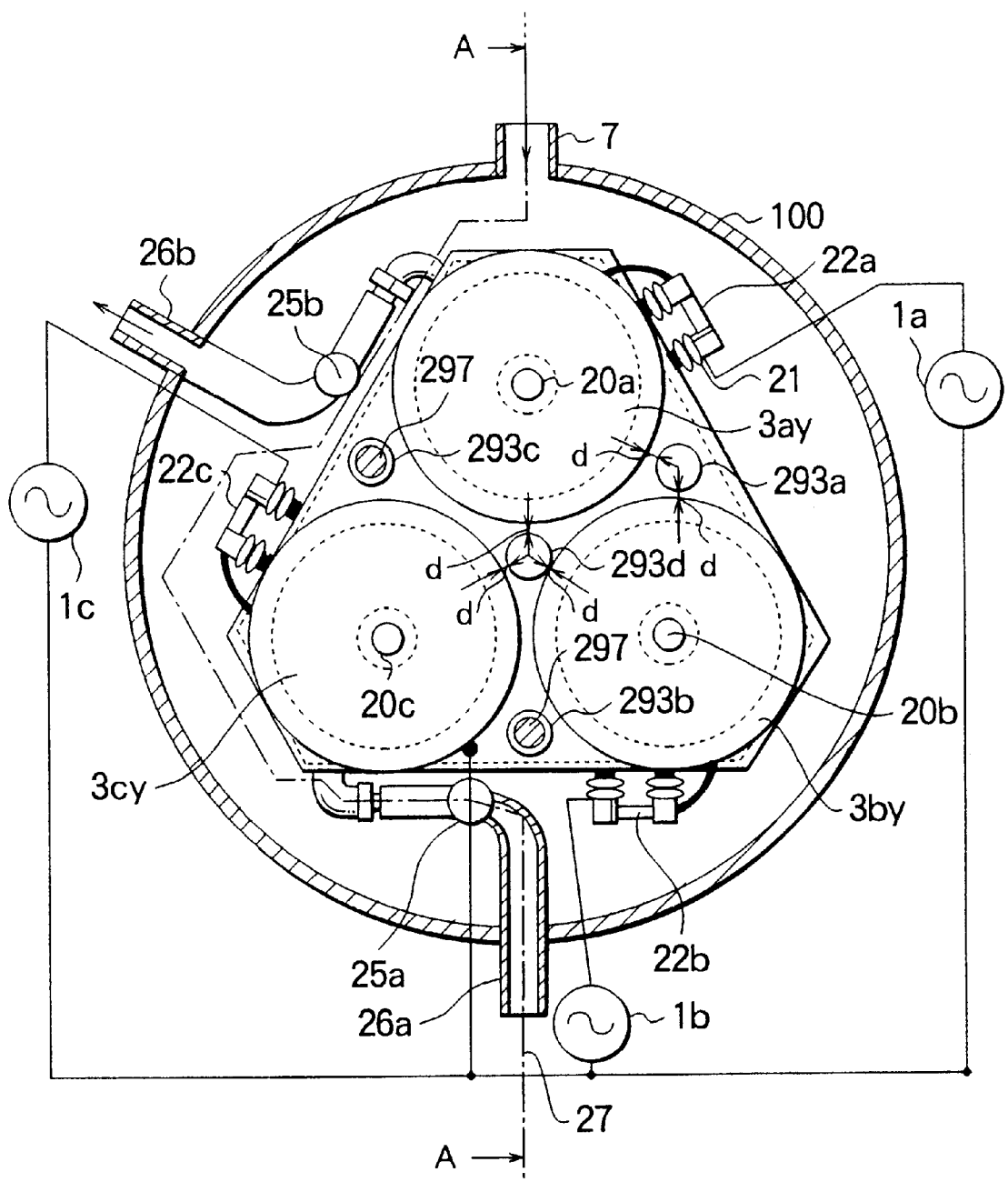
FIG. 22 is a plan view showing a major portion of the ozone generating apparatus according to a fourteenth embodiment of the present invention.
Figure 23:
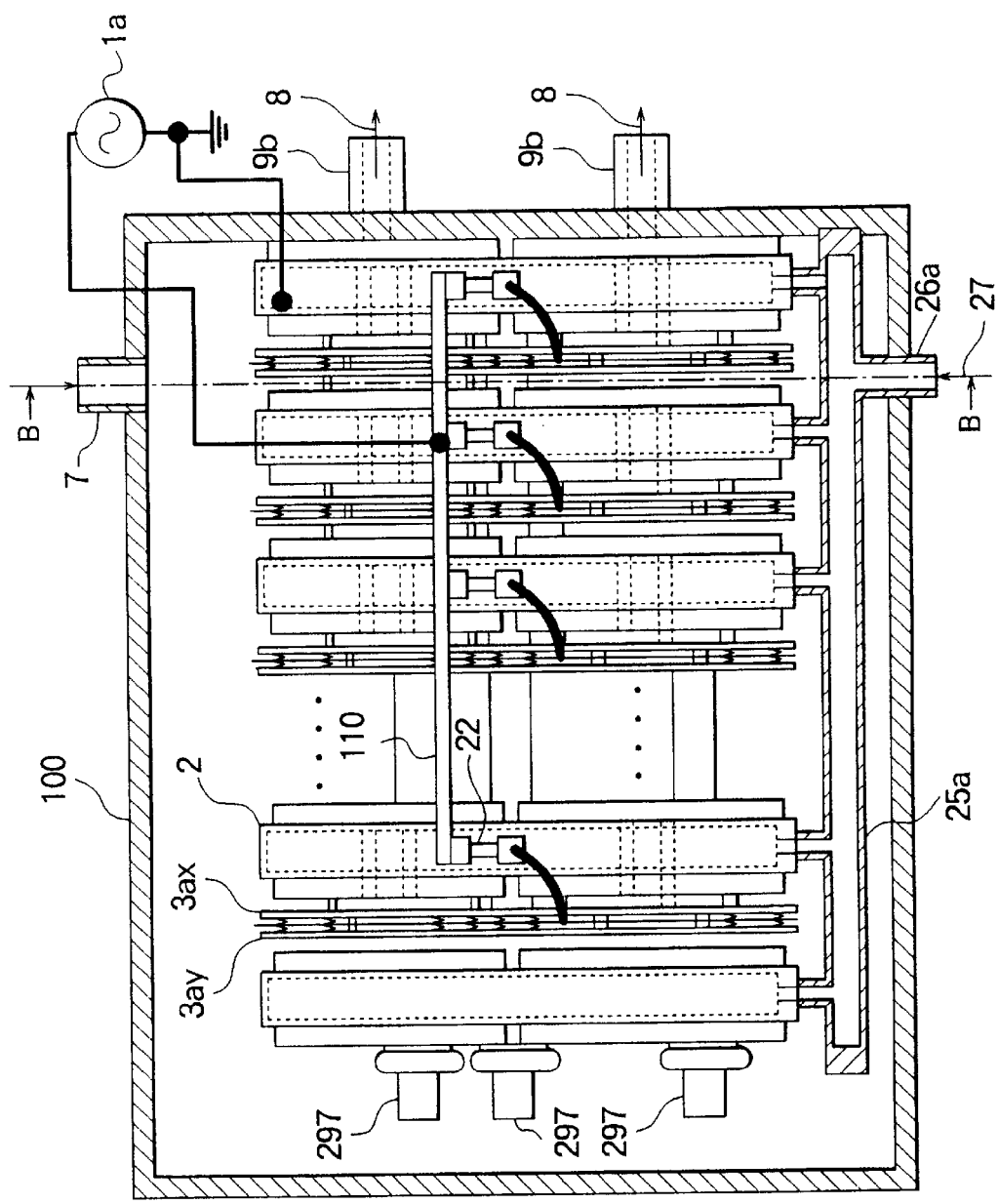
FIG. 23 is a sectional view showing a major portion of the ozone generating apparatus according to the fourteenth embodiment of the invention.

FIGS. 22 and 23 are schematic views showing a configuration of an ozone generating apparatus according to a fourteenth embodiment of the present invention, wherein FIG. 22 is a plan view showing the ozone generating apparatus with some portions in section as viewed in the direction along a line B—B in FIG. 23 which in turn shows the same in a sectional view taken along a line A—A in FIG. 22. In the ozone generating apparatus according to the instant embodiment of the invention, a number of discharge units such as shown in FIG. 1 are stacked and coupled together. In FIGS. 22 and 23, reference numeral 110 denotes a high-voltage feeder bar.

Coupling or joining of the discharge units is realized by inserting a coupling rod 297 into through-holes 293a, 293b, 293c and 293d and secured by a nut In this conjunction, the distance d between the through-holes 293a, 293b, 293c and 293d and the dielectric high-voltage electrodes 3ax, 3bx, 3cx, 3ay, 3by and 3cy is so adjusted that a predetermined distance (not shorter than 3 mm) can be maintained between the coupling rod 297 and each of the dielectric high-voltage electrodes 3ax, 3bx, 3cx, 3ay, 3by and 3cy. Incidentally, in FIG. 22, the coupling rod 297 is shown as extending through only two through-holes 293b and 293c. However, this is only for the purpose of clarity of the drawing. It goes without saying that the coupling rod 297 is inserted to extend through the other through-holes 293a and 293b.

When the coupling rod 297 is positioned in contact with or closely to the dielectric high-voltage electrodes 3ax, 3bx, 3cx, 3ay, 3by and 3cy, there may arise such problem that partial discharge (creeping discharge) and/or silent discharge tends to take place at edge portions of the electrically conductive file of the dielectric member applied with a high voltage and a location where the dielectric member and the ceramic coating are positioned closely to each other, incurring deterioration of insulation of the dielectric member or cracking thereof. In this conjunction, it has been experimentally established that by stacking the discharge units or assemblies with a distance not shorter than 3 mm without contacting the dielectric member with the ceramic coating, neither the creeping discharge nor the silent discharge can occur at the edge portion of the electrically conductive film of the dielectric member and at the locations where the dielectric members art positioned in the vicinity of the ceramic coating, whereby the problems such as deterioration of insulation of the dielectric member, cracking thereof or the like failure due to the discharge can be satisfactorily solved. Thus, the ozone generating apparatus according to the instant embodiment of the invention can equally be implemented with a large capacity in a small or compact size.

Embodiment 15

Figure 24:
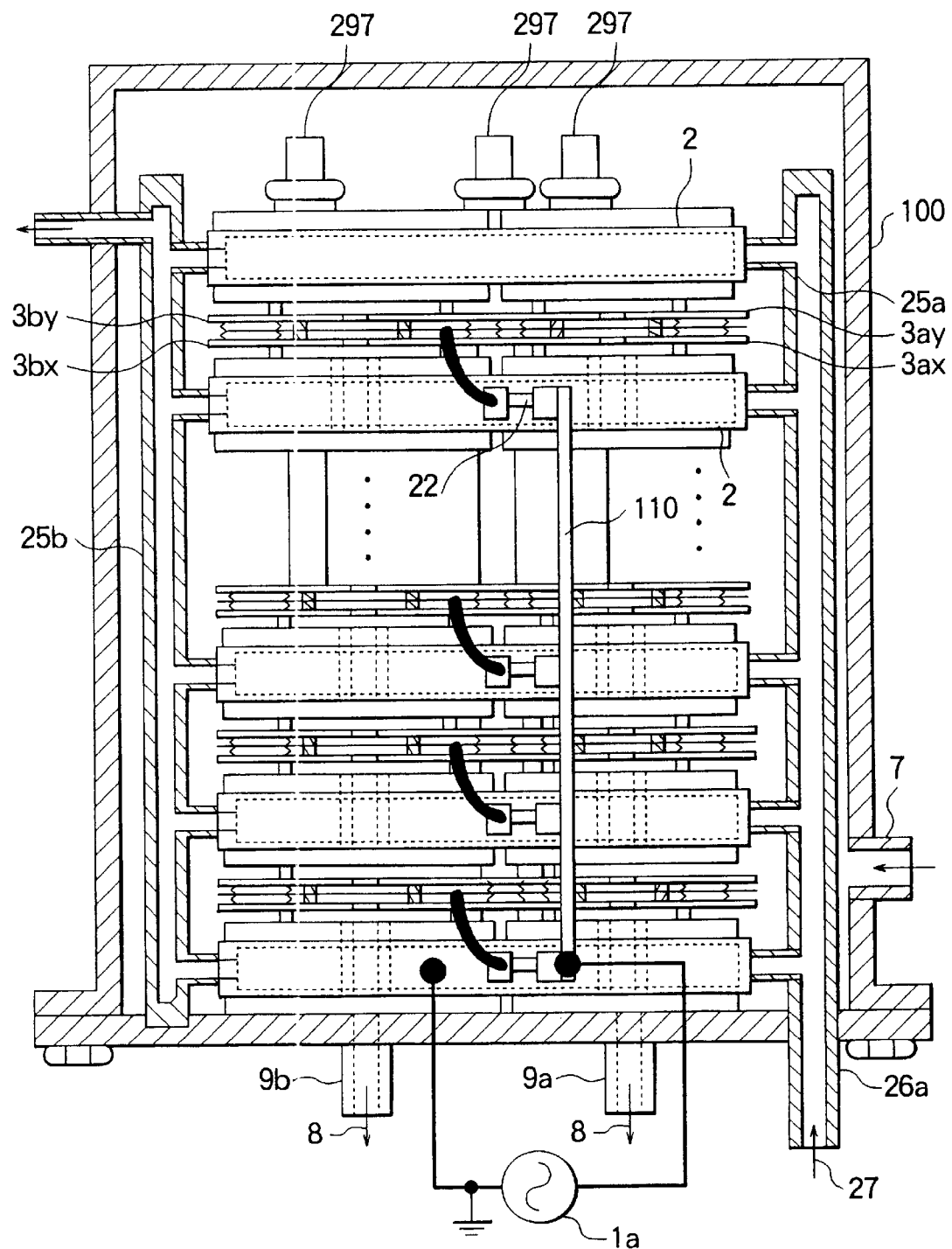
FIG. 24 is a sectional view showing a major portion of an ozone generating apparatus according to a fifteenth embodiment of the present invention.
Figure 25A:
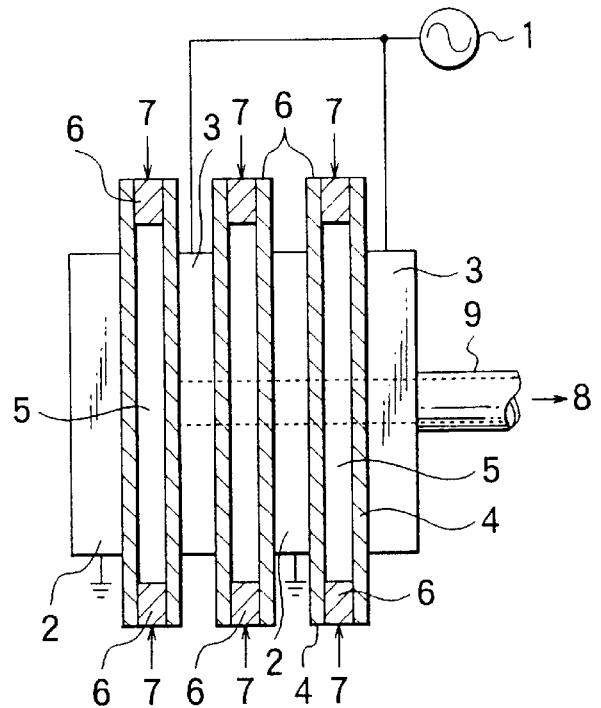
FIG. 25A is a sectional view showing schematically a major portion of a conventional ozone generating apparatus known heretofore.
Figure 25B:
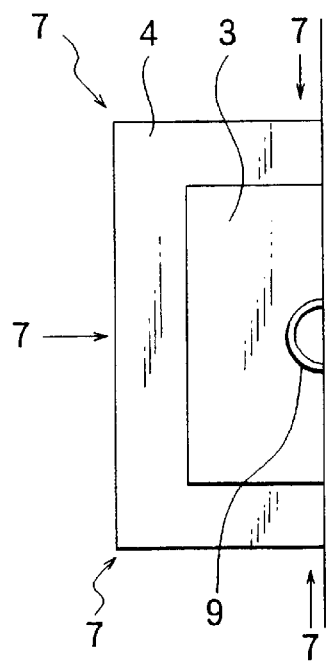
FIG. 25B is a front view showing the same with a right-hand portion being broken away.

FIG. 24 is a sectional view showing major portions of an ozone generating apparatus according to a fifteenth embodiment of the present invention. In all the ozone generating apparatuses described above, the ozone generating discharge units or assemblies are disposed or oriented vertically and stacked in a horizontal direction. According to the instant embodiment of the invention, it is taught to dispose or position the ozone generating discharge cells horizontally and stack them in a vertical direction. In this case, the discharge units or assemblies can be stacked easily, while there arises no necessity of supporting a plurality of stacked discharge units against the weight load thereof by means of the coupling rods 297, as in the case where the ozone discharging cells are stacked horizontally. Besides, because the space required for the installation of the ozone generating apparatus is small, the discharge units or assemblies can easily be stacked even at a narrow place by using a crane or the like. Thus, the ozone generating apparatus can be implemented with a large capacity.

Incidentally, in the ozone generating apparatus shown in FIG. 24, the discharge assemblies of the structure shown in FIG. 23 are stacked in the vertical direction. However, the inversion is never restricted to this arrangement. Needless to say, the block constituted by a plurality of discharge units or assemblies can be stacked in a similar manner.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the concept of the present invention has been elucidated in conjunction with the ozone generating apparatus for producing ozone in a large amount, it should be appreciated that the basic teachings of the invention can equally be applied to other process such as a decomposition process for decomposing toxic gases discharged from factories or the like by charging the toxic gas to the apparatus in place of an oxygen-containing raw gas. Thus, the invention should not be interpreted strictly to the name "ozone generating apparatus". In other words, any apparatus having structures same as or equivalent to the ozone generating apparatuses disclosed and claimed herein is to be covered by the invention even if the apparatus is used for other processes than the ozonization process.

Accordingly, all suitable modifications and equivalents may be resorted to, falling within the spirit and scope of the invention.

What is claimed is:

1. An ozone generating apparatus, comprising:
   a discharge assembly including an earth electrode and a high-voltage electrode disposed in opposition to each other with a dielectric member being interposed between said earth electrode and said high-voltage electrode for generating electric discharge by applying a high voltage across said earth electrode and said high-voltage electrode,
   wherein a gas containing oxygen is supplied to a discharge space between said electrodes for generating ozone under the action of said electric discharge, and
   wherein said discharge assembly comprises a plurality of discharge cells realized by disposing at least one dielectric member and at least one high- voltage electrode in opposition to said earth electrode in common.

2. An ozone generating apparatus according to claim 1, wherein said at least one high-voltage electrode comprises a single high-voltage electrode having a plurality of discharge points corresponding in number to said discharge cells.

3. An ozone generating apparatus according to claim 1, wherein said at least one high-voltage electrode comprises a plurality of high-voltage electrodes corresponding in number to said discharge cells.

4. An ozone generating apparatus according to claim 1, wherein said earth electrode or said high-voltage electrode has an electrically conductive film deposited on one surface of a disk shaped dielectric member, said electrically conductive film being electrically connected to a plate shaped metal member for feeding electric energy.

5. An ozone generating apparatus according to claim 1, wherein said earth electrode or said high-voltage electrode has a discharge surface deposited with a dielectric film.

6. An ozone generating apparatus according to claim 1, wherein said earth electrode is formed of light metal or light alloy.

7. An ozone generating apparatus according to claim 1, wherein said earth electrode is formed in a polygonal shape.

8. An ozone generating apparatus according to claim 1, wherein at least a portion of said electrodes is so processed as to be capable of withstanding action of ozone.

9. An ozone generating apparatus according to claim 1, wherein said earth electrode having a hollow portion through which a cooling medium flows, and
   wherein a surface of said earth electrode which is brought into contact with said cooling medium is treated by an anticorrosion process.

10. An ozone generating apparatus, comprising:
    a discharge assembly including an earth electrode and a high-voltage electrode disposed in opposition to each other with a dielectric member being interposed between said earth electrode and said high-voltage electrode for generating electric discharge by applying a high voltage across said earth electrode and said high-voltage electrode, wherein a gas containing oxygen is supplied to a discharge space between said electrodes for generating ozone under the action of said electric discharge,
    wherein said dielectric member and said high-voltage electrode are held by said earth electrode.

11. An ozone generating apparatus according to claim 10, wherein said earth electrode holds an overcurrent protecting fuse at a side surface thereof, said overcurrent protecting fuse being inserted between a high-voltage power source and said high-voltage electrode.

12. An ozone generating apparatus according to claim 10, wherein a plurality of said discharge assemblies are stacked in a multi-stage structure by means of a coupling rod for holding said discharge assemblies with a distance from said dielectric member.

13. An ozone generating apparatus according to claim 10, wherein a plurality of said discharge assemblies are stacked in a vertical direction.

14. An ozone generating apparatus, comprising:
    a plurality of discharge assemblies each including an earth electrode and a high-voltage electrode disposed in opposition to each other with a dielectric member being interposed therebetween for generating electric discharge under a high voltage applied across said electrodes,
    wherein said plurality of discharge assemblies are stacked and secured together to constitute a block,
    wherein a plurality of said blocks are stacked and secured together to constitute a module, and
    wherein a gas containing oxygen is supplied to discharge spaces between said electrodes to thereby produce ozone under the action of said electric discharge.

15. An ozone generating apparatus according to claim 14; wherein said discharge assembly is constituted by a plurality of discharge cells realized by disposing at least one of said dielectric member and said high-voltage electrode in a corresponding number in opposition to said earth electrode in common.

16. An ozone generating apparatus according to claim 14, wherein said plurality of stacked blocks are secured together by inserting coupling rods through a plurality of hooks provided at lateral surfaces of said earth electrodes or alternatively through-holes formed to extend through said earth electrodes.

\* \* \* \* \*